US012665910B2

(12) United States Patent
Lawson

(10) Patent No.: US 12,665,910 B2
(45) Date of Patent: *Jun. 23, 2026

(54) METHOD AND SYSTEM FOR DETERMINING AND ACTING ON A STRUCTURED DOCUMENT CYBER THREAT RISK

(71) Applicant: Darktrace Holdings Limited, Cambridge (GB)

(72) Inventor: Antony Lawson, Tyne & Wear (GB)

(73) Assignee: Darktrace Holdings Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,850

(22) Filed: Apr. 1, 2024

(65) Prior Publication Data

US 2024/0275799 A1     Aug. 15, 2024

Related U.S. Application Data

(63) Continuation of application No. 17/187,381, filed on Feb. 26, 2021, now Pat. No. 11,985,142.

(Continued)

(51) Int. Cl.
*H04L 9/00* (2022.01)
*G06F 18/214* (2023.01)
(Continued)

(52) U.S. Cl.
CPC ........ *H04L 63/1416* (2013.01); *G06F 18/214* (2023.01); *H04L 41/16* (2013.01);
(Continued)

(58) Field of Classification Search
CPC ..... H04L 63/1416; H04L 41/16; H04L 63/02; H04L 63/0869; H04L 63/20;
(Continued)

(56) References Cited

U.S. PATENT DOCUMENTS 6,154,844 A    11/2000  Touboul et al.
6,965,968 B1   11/2005  Touboul
(Continued)

FOREIGN PATENT DOCUMENTS

EP           2922268 A1    9/2015
WO        2001031420 A2    5/2001
(Continued)

OTHER PUBLICATIONS

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.

(Continued)

*Primary Examiner* — Syed M Ahsan
(74) *Attorney, Agent, or Firm* — Rutan and Tucker, LLP

(57)     ABSTRACT

A cyber defense system using machine learning models trained on the classification of structured documents, such as emails, in order to identify a cyber threat risk of the incoming or outgoing structured document and to cause one or more autonomous actions to be taken in relation to the structured document based on a comparison of a category the structured document is classified with, a score associated with the classification and a threshold score. For incoming structured documents, the autonomous actions of the cyber defense system may act to contain a malign nature of identified incoming structured documents. For outgoing structured documents, the autonomous actions of the cyber defense system may act to prevent the structured document from being sent to an unintended recipient.

19 Claims, 8 Drawing Sheets

Related U.S. Application Data

(60) Provisional application No. 63/026,446, filed on May 18, 2020, provisional application No. 62/983,307, filed on Feb. 28, 2020.

(51) Int. Cl.
*H04L 9/40* (2022.01)
*H04L 41/16* (2022.01)

(52) U.S. Cl.
CPC .......... *H04L 63/02* (2013.01); *H04L 63/0869* (2013.01); *H04L 63/20* (2013.01)

(58) Field of Classification Search
CPC ... H04L 41/145; H04L 43/12; H04L 63/1408; G06F 18/214
See application file for complete search history.

(56) References Cited

U.S. PATENT DOCUMENTS

| | | | |
|---|---|---|---|
| 7,307,999 | B1 | 12/2007 | Donaghey |
| 7,418,731 | B2 | 8/2008 | Touboul |
| 7,448,084 | B1 | 11/2008 | Apap et al. |
| 7,890,869 | B1 | 2/2011 | Mayer et al. |
| 8,312,540 | B1 | 11/2012 | Kahn et al. |
| 8,661,538 | B2 | 2/2014 | Cohen-Ganor et al. |
| 8,819,803 | B1 | 8/2014 | Richards et al. |
| 8,879,803 | B2 | 11/2014 | Ukil et al. |
| 8,966,036 | B1 | 2/2015 | Asgekar et al. |
| 9,032,038 | B2 | 5/2015 | Dick et al. |
| 9,043,905 | B1 | 5/2015 | Allen et al. |
| 9,106,687 | B1 | 8/2015 | Sawhney et al. |
| 9,141,940 | B2 | 9/2015 | Pocklington et al. |
| 9,185,095 | B1 | 11/2015 | Moritz et al. |
| 9,213,990 | B2 | 12/2015 | Adjaoute |
| 9,348,742 | B1 | 5/2016 | Brezinski |
| 9,401,925 | B1 | 7/2016 | Guo et al. |
| 9,406,048 | B2 | 8/2016 | Meister et al. |
| 9,516,039 | B1 | 12/2016 | Yen et al. |
| 9,516,053 | B1 | 12/2016 | Muddu et al. |
| 9,641,544 | B1 | 5/2017 | Treat et al. |
| 9,712,548 | B2 | 7/2017 | Shmueli et al. |
| 9,727,723 | B1 | 8/2017 | Kondaveeti et al. |
| 10,237,298 | B1 | 3/2019 | Nguyen et al. |
| 10,268,821 | B2 | 4/2019 | Stockdale et al. |
| 10,419,466 | B2 | 9/2019 | Ferguson et al. |
| 10,516,693 | B2 | 12/2019 | Stockdale et al. |
| 10,701,093 | B2 | 6/2020 | Dean et al. |
| 2002/0174217 | A1 | 11/2002 | Anderson et al. |
| 2002/0186698 | A1 | 12/2002 | Ceniza |
| 2003/0070003 | A1 | 4/2003 | Chong et al. |
| 2004/0083129 | A1 | 4/2004 | Herz |
| 2004/0167893 | A1 | 8/2004 | Matsunaga et al. |
| 2005/0065754 | A1 | 3/2005 | Schaf et al. |
| 2005/0203929 | A1 | 9/2005 | Hazarika et al. |
| 2007/0118909 | A1 | 5/2007 | Hertzog et al. |
| 2007/0226300 | A1 | 9/2007 | Smith et al. |
| 2007/0294187 | A1 | 12/2007 | Scherrer |
| 2007/0294428 | A1* | 12/2007 | Guy ..................... G06Q 10/107 709/245 |
| 2008/0005137 | A1 | 1/2008 | Surendran et al. |
| 2008/0077358 | A1 | 3/2008 | Marvasti |
| 2008/0109730 | A1 | 5/2008 | Coffman et al. |
| 2009/0106174 | A1 | 4/2009 | Battisha et al. |
| 2009/0182818 | A1 | 7/2009 | Krywaniuk et al. |
| 2009/0254971 | A1 | 10/2009 | Herz et al. |
| 2009/0327438 | A1 | 12/2009 | Cheng et al. |
| 2010/0009357 | A1 | 1/2010 | Nevins et al. |
| 2010/0095374 | A1 | 4/2010 | Gillum et al. |
| 2010/0107254 | A1 | 4/2010 | Eiland et al. |
| 2010/0125908 | A1 | 5/2010 | Kudo |
| 2010/0198931 | A1 | 8/2010 | Pocklington et al. |
| 2010/0235908 | A1 | 9/2010 | Eynon et al. |
| 2010/0299292 | A1 | 11/2010 | Collazo |
| 2011/0055334 | A1 | 3/2011 | Tivyan et al. |
| 2011/0093428 | A1 | 4/2011 | Wisse |
| 2011/0213742 | A1 | 9/2011 | Lemmond et al. |
| 2011/0261710 | A1 | 10/2011 | Chen et al. |
| 2012/0096549 | A1 | 4/2012 | Amini et al. |
| 2012/0137367 | A1 | 5/2012 | Dupont et al. |
| 2012/0209575 | A1 | 8/2012 | Barbat et al. |
| 2012/0210388 | A1 | 8/2012 | Kolishchak |
| 2012/0284791 | A1 | 11/2012 | Miller et al. |
| 2012/0304288 | A1 | 11/2012 | Wright et al. |
| 2013/0091539 | A1 | 4/2013 | Khurana et al. |
| 2013/0198119 | A1 | 8/2013 | Eberhardt, III et al. |
| 2013/0198840 | A1 | 8/2013 | Drissi et al. |
| 2013/0254885 | A1 | 9/2013 | Devost |
| 2014/0007237 | A1 | 1/2014 | Wright et al. |
| 2014/0074762 | A1 | 3/2014 | Campbell |
| 2014/0165207 | A1 | 6/2014 | Engel et al. |
| 2014/0215618 | A1 | 7/2014 | Amit |
| 2014/0325643 | A1 | 10/2014 | Bart et al. |
| 2015/0067835 | A1 | 3/2015 | Chari et al. |
| 2015/0081431 | A1 | 3/2015 | Akahoshi et al. |
| 2015/0161394 | A1 | 6/2015 | Ferragut et al. |
| 2015/0163121 | A1 | 6/2015 | Mahaffey et al. |
| 2015/0172300 | A1 | 6/2015 | Cochenour |
| 2015/0180893 | A1 | 6/2015 | Im et al. |
| 2015/0213358 | A1 | 7/2015 | Shelton et al. |
| 2015/0286819 | A1 | 10/2015 | Coden et al. |
| 2015/0310195 | A1 | 10/2015 | Bailor et al. |
| 2015/0319185 | A1 | 11/2015 | Kirti et al. |
| 2015/0341379 | A1 | 11/2015 | Lefebvre et al. |
| 2015/0363699 | A1 | 12/2015 | Nikovski |
| 2015/0379110 | A1 | 12/2015 | Marvasti et al. |
| 2016/0062950 | A1 | 3/2016 | Brodersen et al. |
| 2016/0078365 | A1 | 3/2016 | Baumard |
| 2016/0149941 | A1 | 5/2016 | Thakur et al. |
| 2016/0164902 | A1 | 6/2016 | Moore |
| 2016/0173509 | A1 | 6/2016 | Ray et al. |
| 2016/0241576 | A1 | 8/2016 | Rathod et al. |
| 2016/0352768 | A1 | 12/2016 | Lefebvre et al. |
| 2016/0359695 | A1 | 12/2016 | Yadav et al. |
| 2016/0373476 | A1 | 12/2016 | Dell'Anno et al. |
| 2017/0054745 | A1 | 2/2017 | Zhang et al. |
| 2017/0063907 | A1 | 3/2017 | Muddu et al. |
| 2017/0063910 | A1 | 3/2017 | Muddu et al. |
| 2017/0063911 | A1 | 3/2017 | Muddu et al. |
| 2017/0169360 | A1 | 6/2017 | Veeramachaneni et al. |
| 2017/0270422 | A1 | 9/2017 | Sorakado |
| 2018/0027006 | A1 | 1/2018 | Zimmermann et al. |
| 2018/0167402 | A1 | 6/2018 | Scheidler et al. |
| 2019/0036948 | A1 | 1/2019 | Appel et al. |
| 2019/0044963 | A1 | 2/2019 | Rajasekharan et al. |
| 2019/0251260 | A1 | 8/2019 | Stockdale et al. |
| 2020/0059447 | A1 | 2/2020 | Bahar |
| 2020/0067861 | A1* | 2/2020 | Leddy ................. G06F 21/6245 |
| 2020/0244673 | A1 | 7/2020 | Stockdale |
| 2020/0280575 | A1 | 9/2020 | Dean et al. |
| 2020/0344183 | A1 | 10/2020 | Mummidi |
| 2021/0120027 | A1 | 4/2021 | Dean et al. |
| 2021/0157919 | A1 | 5/2021 | Stockdale et al. |
| 2021/0273958 | A1 | 9/2021 | McLean |

FOREIGN PATENT DOCUMENTS

| | | | |
|---|---|---|---|
| WO | 2008121945 | A2 | 10/2008 |
| WO | 2013053407 | A1 | 4/2013 |
| WO | 2014088912 | A1 | 6/2014 |
| WO | 2015027828 | A1 | 3/2015 |
| WO | 2016020660 | A1 | 2/2016 |

OTHER PUBLICATIONS

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.
Gharan, Shayan Oveis, "Lecture 11: Clustering and the Spectral Partitioning Algorithm" May 2, 2016, 6 pages.
Nikolystylfw, "Can Senseon beat Darktrace at its very own game with its 'An I triangulation' modern technology?" Dec. 22, 2018, nikolystylfw.

(56) References Cited

OTHER PUBLICATIONS

Lunden, Ingrid, "Senseon raises $6.4M to tackle cybersecurity threats with an AI 'triangulation' approach" Feb. 19, 2019, Tech Crunch.

Senseon Tech Ltd., "The State of Cyber Security SME Report 2019" Jun. 3, 2019, 16 pages.

Caithness, Neil, "Supervised/unsupervised cross-over method for autonomous anomaly classification," Oct. 25, 2019, CAMLIS 2019.

Senseon Tech Ltd., "Technology,".

Senseon Tech Ltd., "Senseon & You,".

Senseon Tech Ltd., "Technology Overview,".

Senseon Tech Ltd., "Senseon Enterprise,".

Senseon Tech Ltd., "Senseon Pro,".

Senseon Tech Ltd., "Senseon Reflex,".

U.S. Patent and Trademark Office; Non-Final Office Action, 49 pages.

* cited by examiner

METHOD AND SYSTEM FOR DETERMINING AND ACTING ON A STRUCTURED DOCUMENT CYBER THREAT RISK

CROSS-REFERENCE TO RELATED APPLICATION(S)

This application claims the benefit and priority of 35 USC 120 from U.S. patent application Ser. No. 17/187,381, filed Feb. 26, 2021, titled "A METHOD AND SYSTEM FOR DETERMINING AND ACTING ON A STRUCTURED DOCUMENT CYBER THREAT RISK", which claims the benefit of priority to US Provisional Application No. 62/983,307 filed 28 Feb. 2020, entitled AN ARTIFICIAL INTEL-LIGENCE BASED CYBER SECURITY SYSTEM, and U.S. Provisional Application No. 63/026,446 filed 18 May 2020, entitled A CYBER SECURITY SYSTEM USING ARTIFICIAL INTELLIGENCE, the disclosure of each of which are hereby expressly incorporated by reference herein in their entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatso-ever.

FIELD

Embodiments of the design provided herein generally relate to a cyber threat defense system. In an embodiment, Artificial Intelligence is applied to analyzing Cyber Security threats coming from and/or associated with a structured document, such as an email, an instant message, a text message, or other structured electronic communication.

BACKGROUND

In the cyber security environment, firewalls, endpoint security methods and other tools such as SIEMs and sand-boxes are deployed to enforce specific policies, and provide protection against certain threats. These tools currently form an important part of an organization's cyber defense strat-egy, but they are insufficient in the new age of cyber threat. Legacy tools are failing to deal with new cyber threats because the traditional approach relies on being able to pre-define the cyber threat in advance, by writing rules or producing signatures. In today's environment, this approach to defend against cyber threats is fundamentally flawed:

Threats are constantly evolving—novel attacks do not match historical-attack "signatures", and even subtle changes to previously understood attacks can result in them going undetected by legacy defenses;

Rules and policies defined by organizations are continu-ally insufficient—security teams simply can't imagine every possible thing that may go wrong in future; and Employee 'insider' threat is a growing trend—it is diffi-cult to spot malicious employees behaving inappropri-ately as they are a legitimate presence on the business network.

The reality is that modern threats bypass the traditional legacy defense tools on a daily basis. These tools need a new tool based on a new approach that can complement them and mitigate their deficiencies at scale across the entirety of digital organizations. In the complex modern world, it is advantageous that the approach is fully automated as it is virtually impossible for humans to sift through the vast amount of security information gathered each minute within a digital.

SUMMARY

In an embodiment, various methods, apparatuses, and systems are discussed for a cyber security system to protect from cyber threat risks in relation to outgoing or incoming structured documents that are addressed to a recipient by a sender. One or more machine learning models are trained on the classification of structured documents with one or more of a plurality of categories based on a plurality of charac-teristics of the structured documents. A classifier is config-ured to receive a structured document for analysis and to parse the structured document to extract the plurality of characteristics of the structured document. The classifier is further configured to classify the structured document with one or more of the plurality of categories based on the extracted plurality of characteristics and the one or more machine learning models, and to determine an associated score for the classification. An autonomous response module is then configured to, based on a comparison of the associ-ated score with a threshold, cause one or more autonomous actions to be taken in relation to the structured document.

In one aspect of the present disclosure, the structured document is to be sent from the sender to an indicated recipient; each category of the plurality of categories rep-resents a respective recipient of a plurality of recipients known to the sender; and the associated score represents the probability of a match between the indicated recipient and the extracted plurality of characteristics. In this aspect, the classifier may be configured to determine one or more further scores representing the respective probability of a match between the extracted plurality of characteristics and each of the other recipients known to the sender; and the threshold may represent the score of an alternative recipient, of the other recipients known to the sender, having the highest probability of a match. Moreover, the one or more autonomous actions may comprise, if the associated score is less than the threshold, displaying an alert to the sender on the sender user interface indicating that the alternative recipient has a higher probability of a match than the indicated recipient.

In this manner, the system of this aspect may use the one or more machine learning models to determine a set of scores associated with the respective matches between the characteristics extracted from the structured document and characteristic signatures associated with the recipient indi-cated in a structured document to be sent as well as other recipients known to the sending user. Where a recipient other than the indicated recipient is determined to have the best match/highest score, in respect of the extracted char-acteristics, this may be brought to the attention of the sender by displaying an alert on a sender user interface.

In a particular example embodiment of this aspect, the one or more of the machine learning models are trained to identify, for each recipient known to the sender, one or more indicators corresponding to characteristics that are fre-quently present in structured documents sent by the sender and addressed to the respective recipient known to the sender relative to those addressed to other recipients known to the sender; and the classifier classifies the structured document with one or more of the categories representing the plurality of recipients known to the sender by comparing the extracted plurality of characteristics with the one or more indicators for each recipient known to the sender.

In a further aspect of the present disclosure, the structured document has instead been sent to a user from a given sender. In this aspect, the one or more categories may comprise one or more malign categories and, when the associated score determined for the one or more malign categories is above the threshold, the one or more autonomous actions comprise one or more actions to contain the malign nature of the sent structured document.

In this manner, the system of this further aspect of the present disclosure may determine whether an incoming structured document represents a potential cyber threat and what type of cyber threat this may be. Appropriate autonomous actions may then be performed by the system to contain or neutralize the potential cyber threat associated with the incoming structured document. By pulling together a wide variety of characteristics, the apparatus and system can provide an improved granularity in the classification of these structured documents and this then results in the ability to provide improved decision making/autonomous actions in response to this classification.

These and other features of the design provided herein can be better understood with reference to the drawings, description, and claims, all of which form the disclosure of this patent application.

DRAWINGS

The drawings refer to some embodiments of the design provided herein in. In particular:

Figure 3:
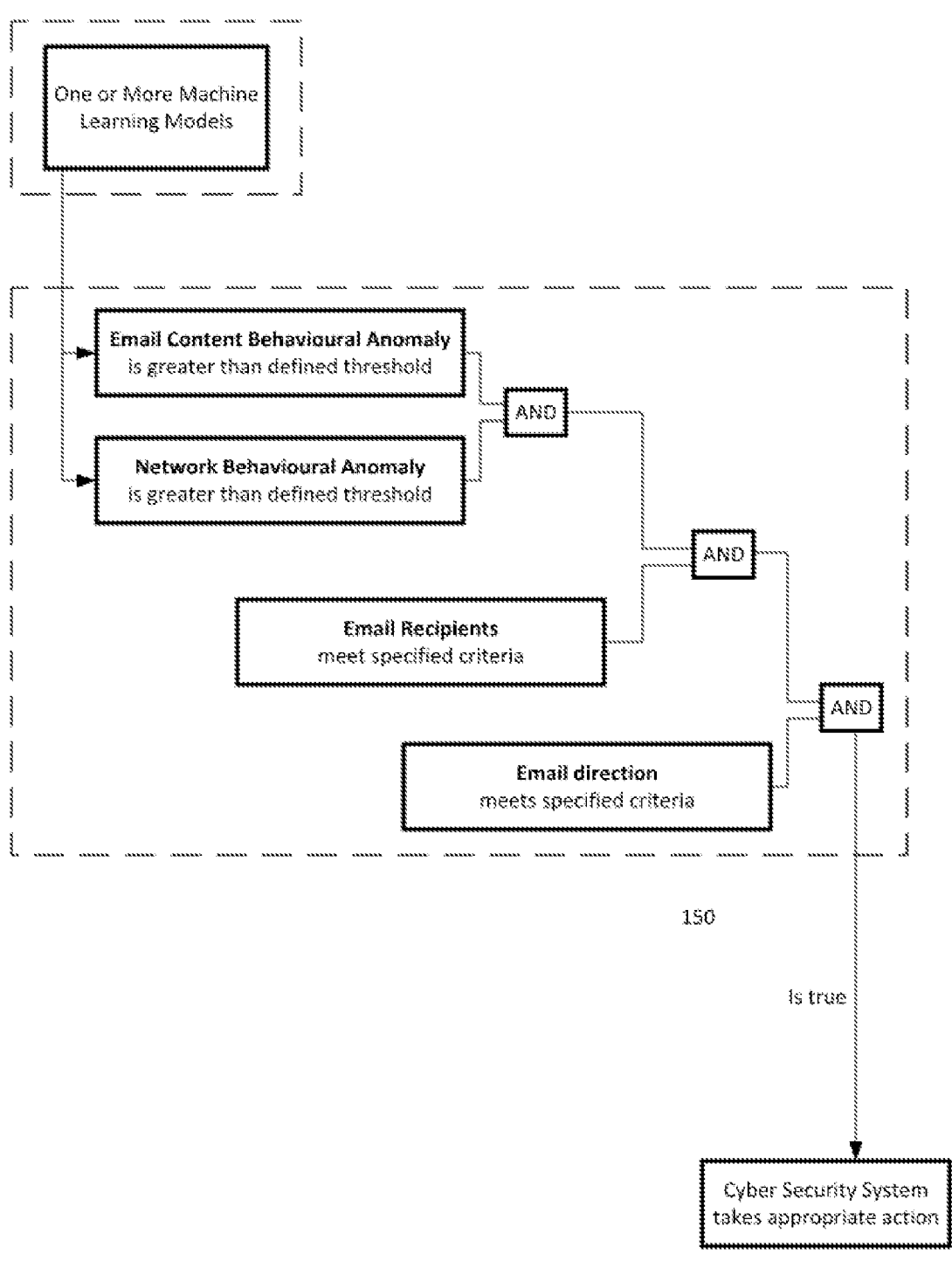
Figure 4:
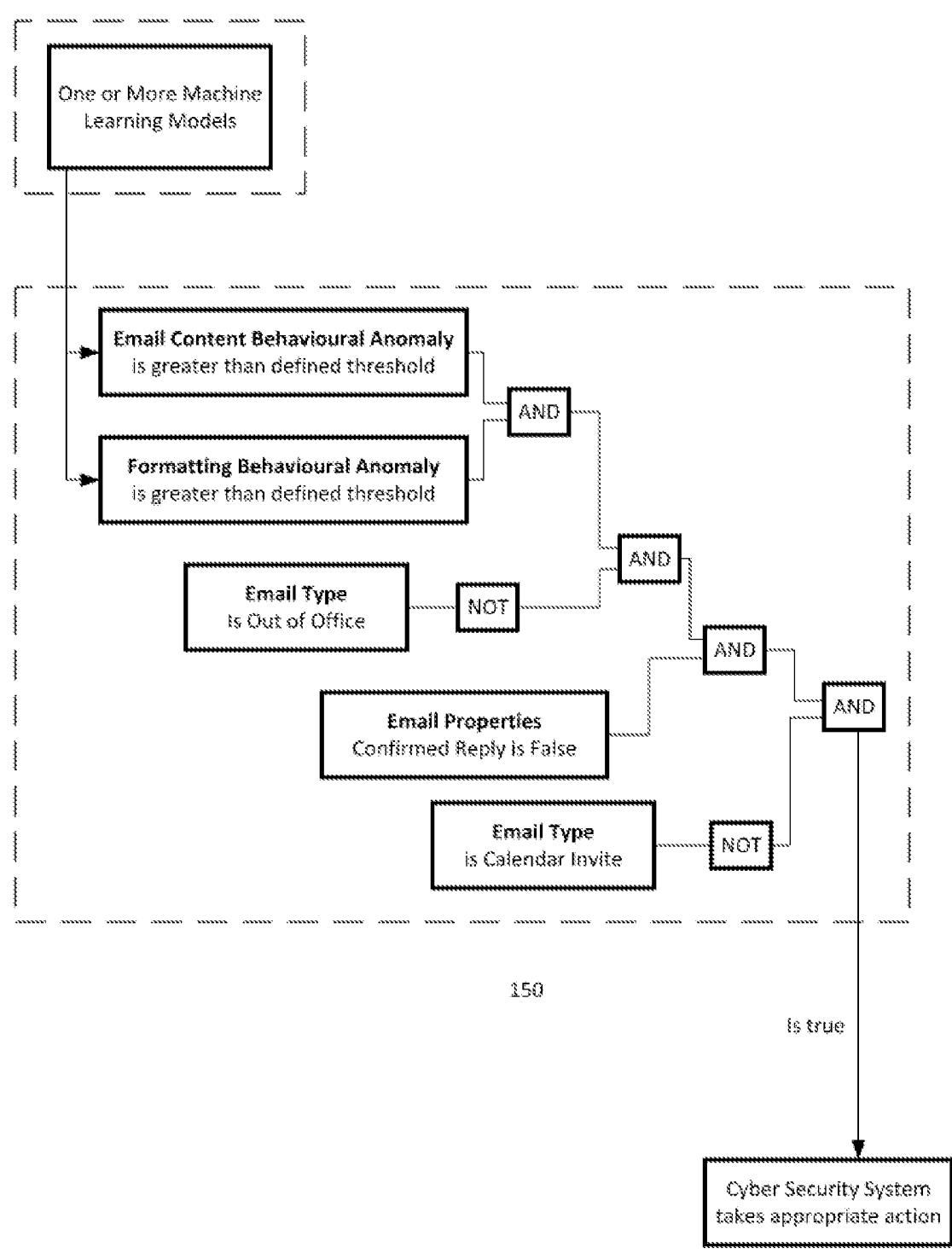
Figure 5:
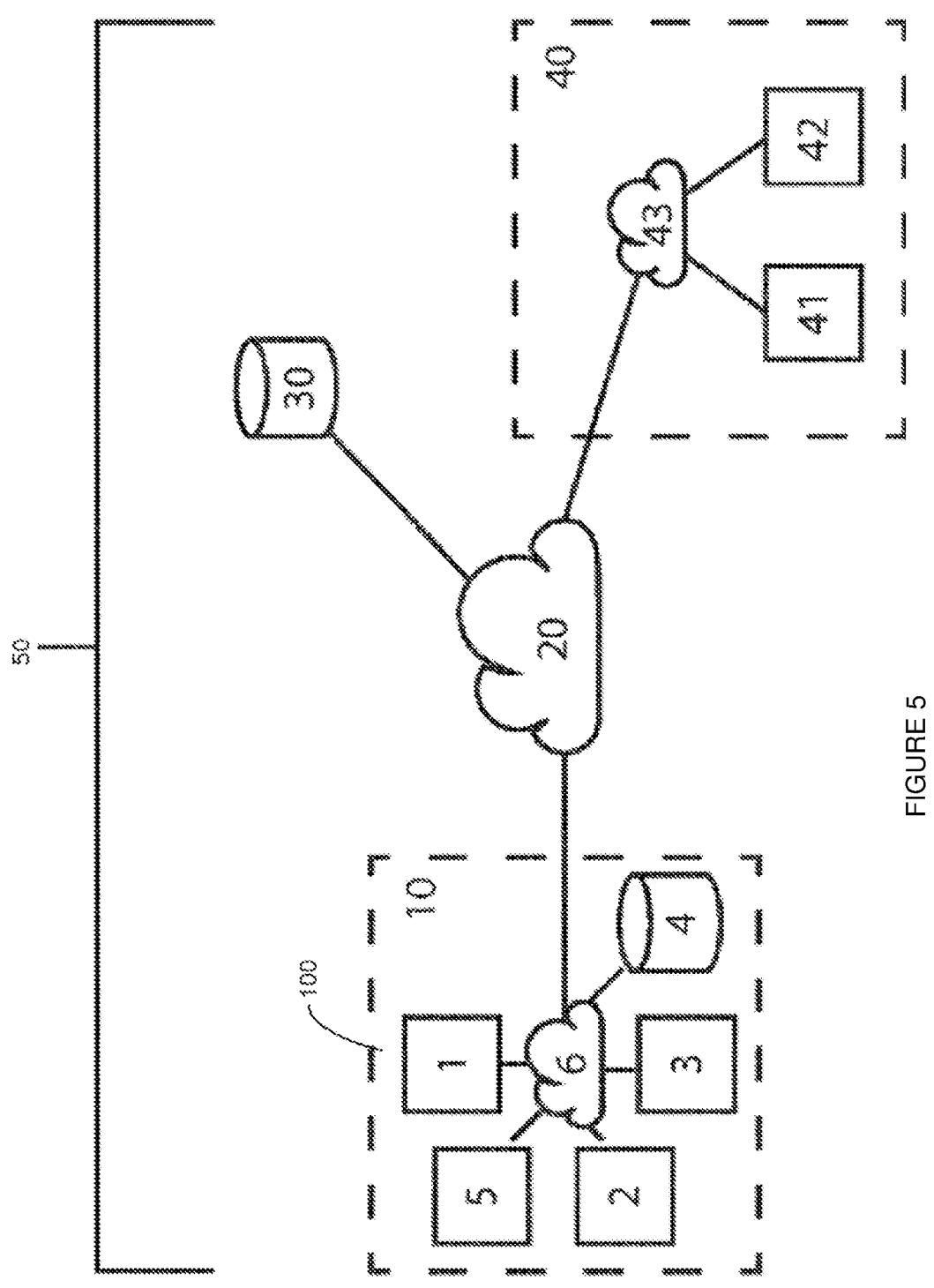
Figure 6:
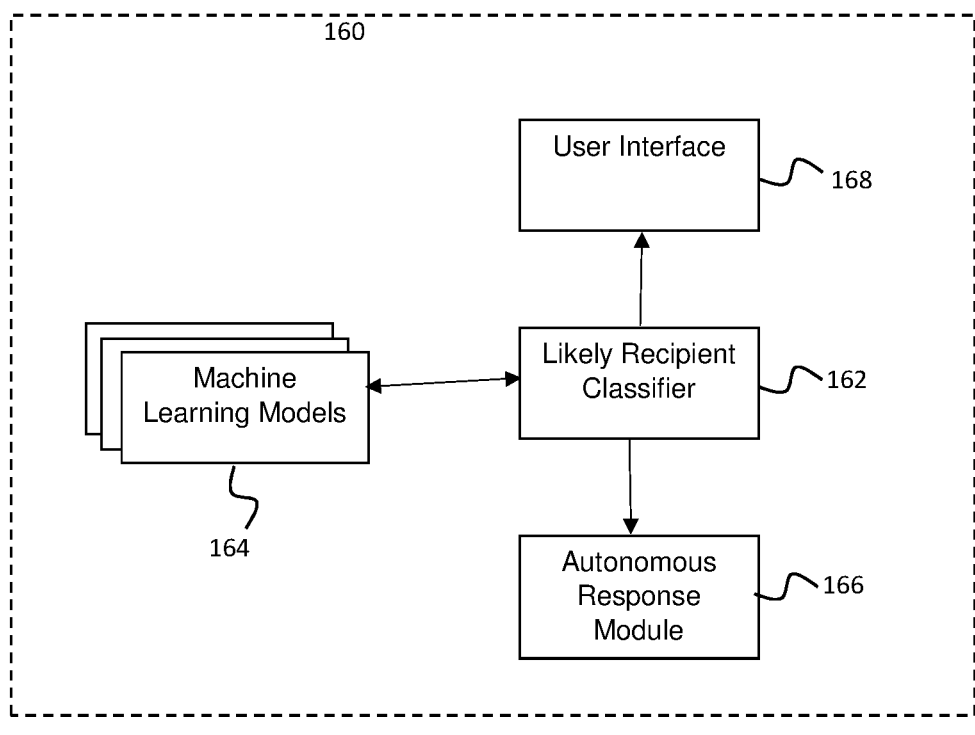
Figure 7:
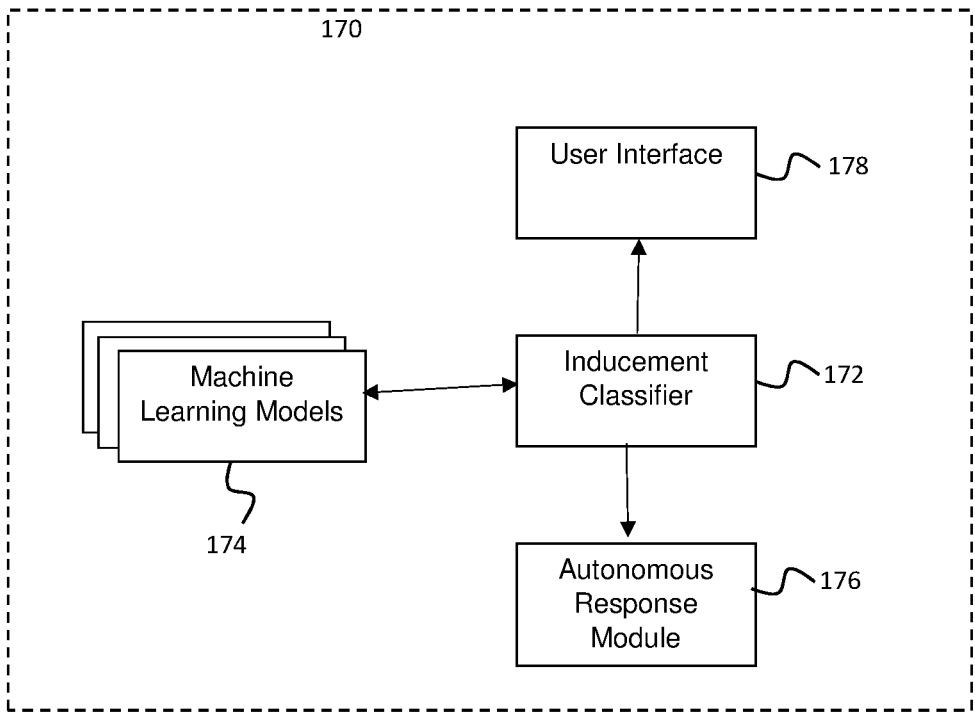
Figure 8:
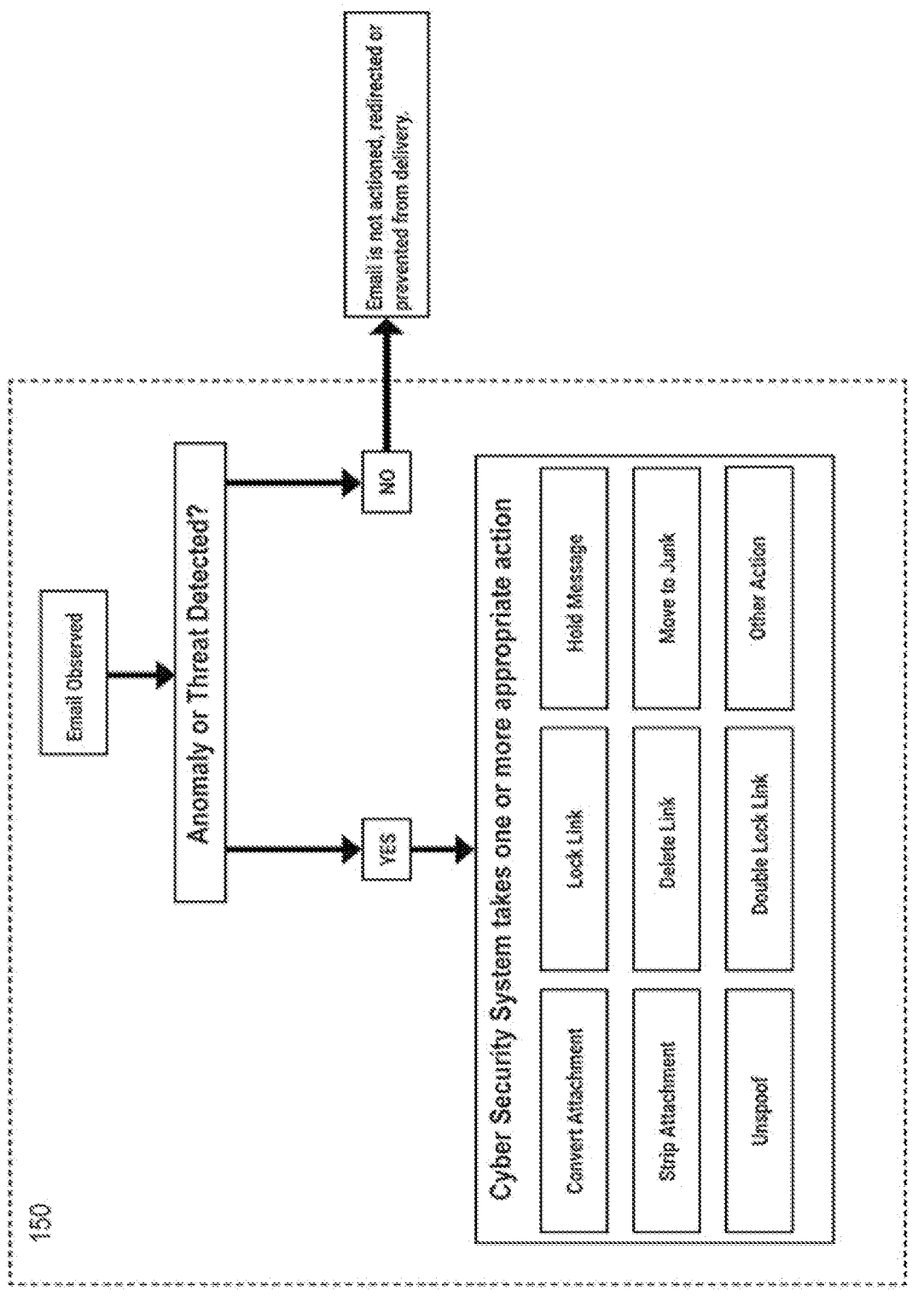
Figure 9:
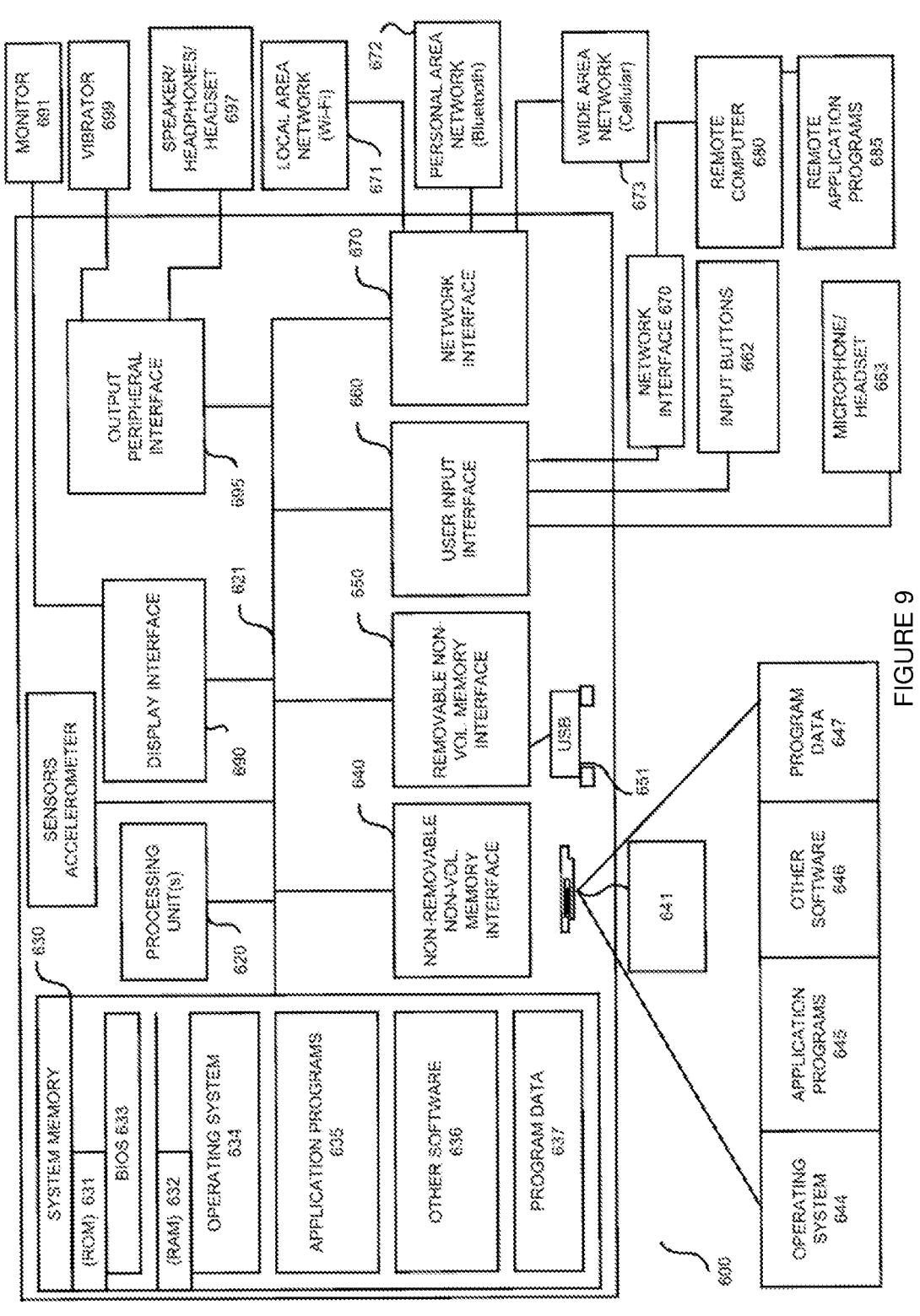

FIG. 3 illustrates a block diagram of an example of the cyber threat module determining a threat risk parameter that factors in how the chain of unusual behaviors correlate to potential cyber threats and 'the likelihood that this chain of one or more unusual behaviors of the email activity and user activity under analysis fall outside of derived normal benign behavior;' and thus, is malicious behavior;

FIG. 4 illustrates a block diagram of an example of the cyber threat defense system referencing one or more machine learning models trained on gaining an understanding of a plurality of characteristics on an email itself and its related data, including classifying the properties of the email and its meta data;

FIG. 5 illustrates an example cyber threat defense system protecting an example network of computer systems;

FIG. 6 illustrates an apparatus 160 according to an aspect of the present disclosure;

FIG. 7 illustrates an apparatus 170 according to another aspect of the present disclosure;

FIG. 8 illustrates a block diagram of an embodiment of example autonomous actions that the autonomous response module can be configured to take without a human initiating that action; and FIG. 9 illustrates a block diagram of an embodiment of one or more computing devices that can be used in combination with the present disclosure.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, artificial intelligence is used to analyze cyber security threats in the present disclosure. A cyber defense system can use models that are trained on a wide range of characteristics extracted from structured documents, such as an email, an instant message, a text message, or other structured electronic communication. The following disclosure will describe a cyber defense system implemented in relation to emails; however, it will be appreciated by the skilled person that this teaching could easily be translated to other types of structured documents without departing from the scope of the present application.

Further models of the cyber defense system may be trained on a normal behavior of email activity and user activity associated with an email system. A cyber threat module may reference the models that are trained on the normal behavior of email activity and user activity. A determination is made of a threat risk parameter that factors in the likelihood that a chain of one or more unusual behaviors of the email activity and user activity under analysis fall outside of derived normal benign behavior. An autonomous response module can be used, rather than a human taking an action, to cause one or more autonomous rapid actions to be taken to contain the cyber threat when the threat risk parameter from the cyber threat module is equal to or above an actionable threshold.

Example Cyber Security Appliance

Figure 1:
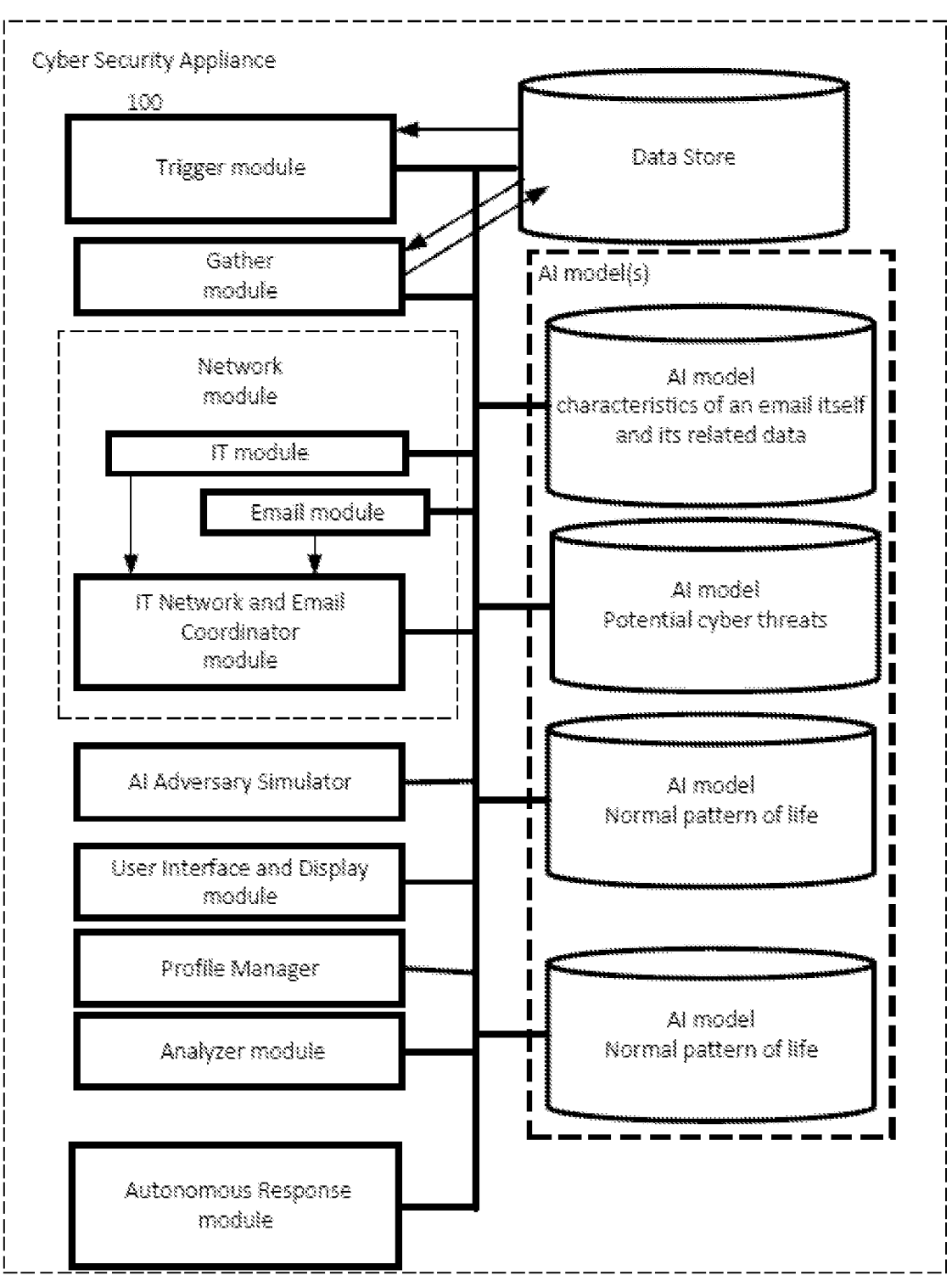
FIG. 1 illustrates a block diagram of an example cyber security appliance 100.

FIG. 1 illustrates a selection of modules forming at least part of an example cyber security appliance 100/cyber threat system. Various Artificial Intelligence models and modules of the cyber security appliance 100/cyber threat system cooperate to protect a system, including but not limited to an email network, from cyber threats. The cyber security appliance 100 may include a trigger module, a gatherer module, an analyzer module, an assessment module, a formatting module, an autonomous report composer, a data store, one or more Artificial Intelligence models trained on potential cyber threats and their characteristics, symptoms, remediations, etc., one or more Artificial Intelligence models trained with machine learning on a normal pattern of life for entities in the network, one or more Artificial Intelligence models trained with machine learning on threat report generation, and multiple libraries of text and visual representations to cooperate the library of page templates to populate visual representations, such as graphs, and text on the pages of the threat report.

The one or more machine learning models may include a first Artificial Intelligence model trained on characteristics of an email itself and its related data, a second Artificial Intelligence model trained on potential cyber threats, and one or more Artificial Intelligence models each trained on different users, devices, system activities and interactions between entities in the system, and other aspects of the system. An example network of an email system will be used to illustrate portions of a cyber security appliance 100. However, it will be appreciated by the skilled person that this teaching could easily be translated to systems for handling types of structured documents other than email without departing from the scope of the present application—for example, an instant message, a text message, or other structured electronic communication Referring to FIG. 1, the trigger module may detect time stamped data indicating an event is occurring and it may then be triggered that something unusual is happening. The gatherer module is triggered by specific events or alerts of i) an abnormal behavior, ii) a suspicious activity, and iii) any combination of both. The trigger module may identify, with one or more AI models trained with machine learning on a normal email pattern of life for entities in the email network, at least one of i) an abnormal behavior, ii) a suspicious activity, and iii) any combination of both, from one or more entities in the system.

The inline data may be gathered on the deployment from a data store when the traffic is observed. The gatherer module may initiate a collection of data to support or refute each of the one or more possible cyber threat hypotheses that could include this abnormal behavior or suspicious activity by the one or more AI models trained on possible cyber threats. The gatherer module cooperates with a data store. The data store stores comprehensive logs for network traffic observed. These logs can be filtered with complex logical queries and each IP packet can be interrogated on a vast number of metrics in the network information stored in the data store.

The data store can store the metrics and previous threat alerts associated with network traffic for a period of time (for example, 27 days may be set as a default value in some embodiments). This corpus of data is fully searchable. The cyber security appliance 100 works with network probes to monitor network traffic and store and record the data and meta data associated with the network traffic in the data store.

Figure 2:
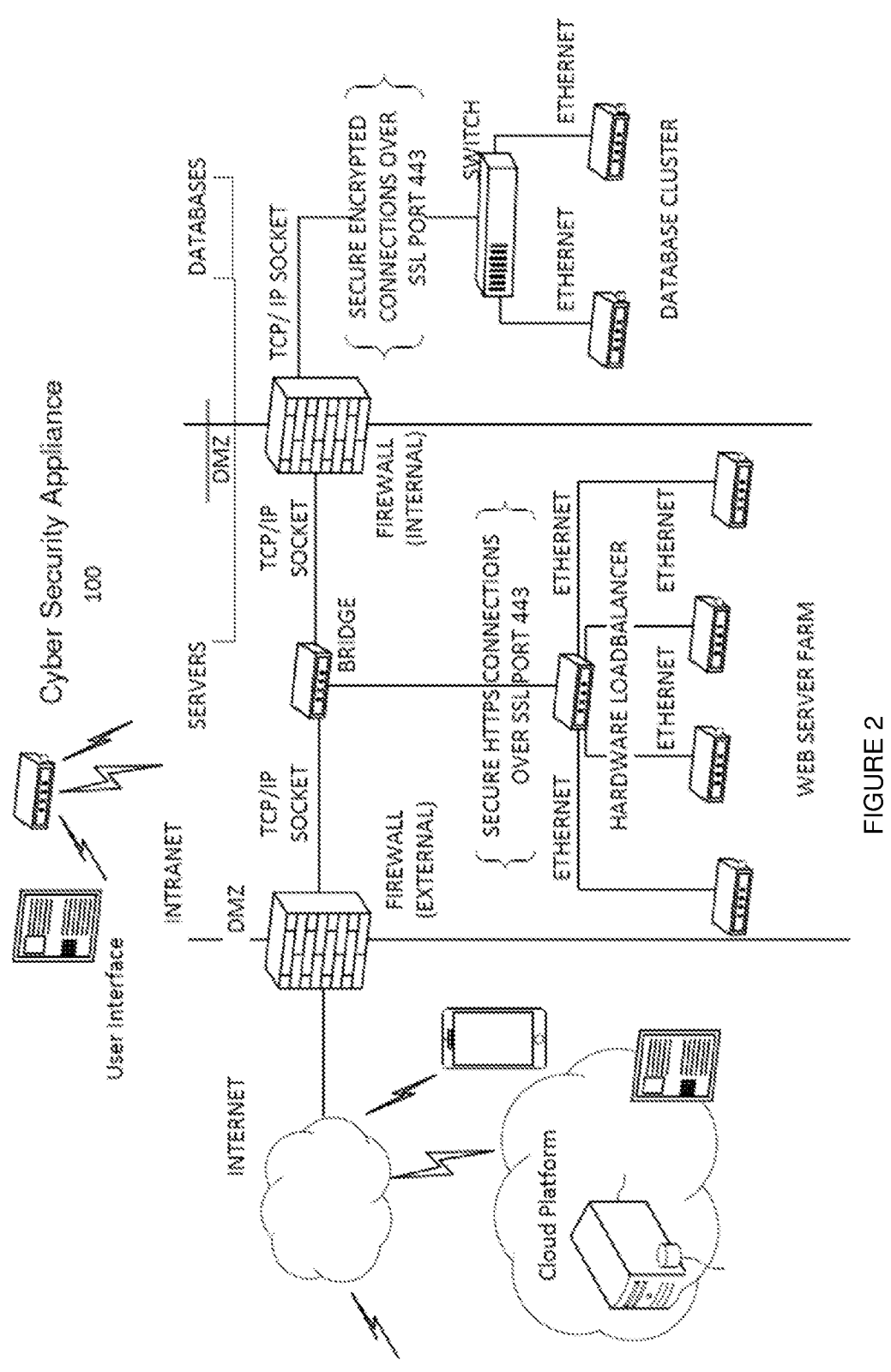
FIG. 2 illustrates a block diagram of an example cyber security appliance 100 monitoring email activity and network activity to feed this data to correlate causal links between these activities to supply this input into the cyber threat analysis.

FIG. 2 illustrates an example cyber security appliance 100 using an intelligent-adversary simulator cooperating with a network module and network probes ingesting traffic data for network devices and network users in the network under analysis.

Referring back to FIG. 1, the gatherer module may consist of multiple automatic data gatherers that each look at different aspects of the data depending on the particular hypothesis formed for the analyzed event. The data relevant to each type of possible hypothesis can be automatically pulled from additional external and internal sources. Some data is pulled or retrieved by the gatherer module for each possible hypothesis.

The gatherer module may further extract data, at the request of the analyzer module, on each possible hypothetical threat that would include the abnormal behavior or suspicious activity; and then, filter that collection of data down to relevant points of data to either 1) support or 2) refute each particular hypothesis of what the potential cyber threat, e.g. the suspicious activity and/or abnormal behavior, relates to. The gatherer module and the data store can cooperate to store an inbound and outbound email flow received over a period of time as well as autonomous actions performed by the autonomous response module on that email flow. The gatherer module may send the filtered down relevant points of data to either 1) support or 2) refute each particular hypothesis to the analyzer module, comprised of one or more algorithms used by the AI models trained with machine learning on possible cyber threats to make a determination on a probable likelihood of whether that particular hypothesis is supported or refuted.

A feedback loop of cooperation between the gatherer module and the analyzer module may be used to apply one or more models trained on different aspects of this process.

The analyzer module can form one or more hypotheses on what are a possible set of activities including cyber threats that could include the identified abnormal behavior and/or suspicious activity from the trigger module with one or more AI models trained with machine learning on possible cyber threats. The analyzer module may request further data from the gatherer module to perform this analysis. The analyzer module can cooperate with the one or more Artificial Intelligence models trained with machine learning on the normal email pattern of life for entities in the email network to detect anomalous email which is detected as outside the usual pattern of life for each entity, such as a user, of the email network. The analyzer module can cooperate with the Artificial Intelligence models trained on potential cyber threats to detect suspicious emails that exhibit traits that may suggest a malicious intent, such as phishing links, scam language, sent from suspicious domains, etc. In addition, the gatherer module and the analyzer module may use a set of scripts to extract data on each possible hypothetical threat to supply to the analyzer module. The gatherer module and analyzer module may use a plurality of scripts to walk through a step-by-step process of what to collect to filter down to the relevant data points (from the potentially millions of data points occurring in the network) to make a decision what is required by the analyzer module.

The analyzer module may further analyze a collection of system data, including metrics data, to support or refute each of the one or more possible cyber threat hypotheses that could include the identified abnormal behavior and/or suspicious activity data with the one or more AI models trained with machine learning on possible cyber threats. The analyzer module then generates at least one or more supported possible cyber threat hypotheses from the possible set of cyber threat hypotheses as well as could include some hypotheses that were not supported/refuted.

The analyzer module may get threat information from Open Source APIs as well as from databases as well as information trained into AI models. Also, probes collect the user activity and the email activity and then feed that activity to the network module to draw an understanding of the email activity and user activity in the email system.

The analyzer module learns how expert humans tackle investigations into specific cyber threats. The analyzer module may use i) one or more AI models and/or ii) rules-based models and iii) combinations of both that are hosted within the plug-in appliance connecting to the network.

The AI models use data sources, such as simulations, database records, and actual monitoring of different human exemplar cases, as input to train the AI model on how to make a decision. The analyzer module also may utilize repetitive feedback, as time goes on, for the AI models trained with machine learning on possible cyber threats via reviewing a subsequent resulting analysis of the supported possible cyber threat hypothesis and supply that information to the training of the AI models trained with machine learning on possible cyber threats in order to reinforce the model's finding as correct or inaccurate.

Each hypothesis of typical threats, e.g. human user insider attack/inappropriate network and/or email behavior, malicious software/malware attack/inappropriate network and/or email behavior, can have various supporting points of data and other metrics associated with that possible threat, and a machine learning algorithm will look at the relevant points of data to support or refute that particular hypothesis of what the suspicious activity and/or abnormal behavior relates to. Networks have a wealth of data and metrics that can be collected and then the mass of data is filtered/condensed down into the important features/salient features of data by the gatherers.

The analyzer module may perform analysis of internal and external data including readout from machine learning models, which output a likelihood of the suspicious activity and/or abnormal behavior related for each hypothesis on what the suspicious activity and/or abnormal behavior relates to with other supporting data to support or refute that hypothesis.

The assessment module may assign a probability, or confidence level/associated score, of a given cyber threat hypothesis that is supported, and a threat level posed by that cyber threat hypothesis, which includes this abnormal behavior or suspicious activity, with the one or more AI models trained on possible cyber threats. The assessment module can cooperate with the autonomous response module to determine an appropriate response to mitigate various cyber-attacks that could be occurring.

The analyzer module can reference machine learning models that are trained on the normal behavior of email activity and user activity associated with at least the email system, where the analyzer module cooperates with the assessment module to determine a threat risk parameter that factors in 'the likelihood that a chain of one or more unusual behaviors of the email activity and user activity under analysis fall outside of derived normal benign behavior;' and thus, are likely malicious behavior.

In an example, the one or more machine learning models can be self-learning models using unsupervised learning and trained on a normal behavior of different aspects of the system, for example, email activity and user activity associated with an email system. The self-learning models of normal behavior are regularly updated. The self-learning model of normal behavior is updated when new input data is received that is deemed within the limits of normal behavior. A normal behavior threshold is used by the model as a moving benchmark of parameters that correspond to a normal pattern of life for the computing system. The normal behavior threshold is varied according to the updated changes in the computer system allowing the model to spot behavior on the computing system that falls outside the parameters set by the moving benchmark.

The cyber security appliance/cyber threat system is configurable in a user interface, by a user, enabling what type of automatic response actions, if any, the cyber security appliance may take when different types of cyber threats, indicated by the pattern of behaviors under analysis, that are equal to or above a configurable level of threat posed by this malicious actor.

The cyber threat defense system 100 may also include one or more machine learning models trained on gaining an understanding of a plurality of characteristics on an email itself and its related data including classifying the properties of the email and its metadata.

The cyber threat module can also reference the machine learning models trained on an email itself and its related data to determine if an email or a set of emails under analysis have potentially malicious characteristics. The cyber threat module can also factor this email characteristics analysis into its determination of the threat risk parameter.

The network module may have one or more machine learning models trained on a normal behavior of users, devices, and interactions between them, on a network, which is tied to the email system. A user interface may have one or more windows to display network data and one or more windows to display emails and cyber security details about those emails through the same user interface on a display screen, which allows a cyber professional to pivot between network data and email cyber security details within one platform, and consider them as an interconnected whole rather than separate realms on the same display screen.

The cyber-threat module can also factor this network analysis into its determination of the threat risk parameter.

The email module monitoring email activity and the network module monitoring network activity may both feed their data to a network & email coordinator module to correlate causal links between these activities to supply this input into the cyber-threat module. The cyber threat module can also factor this network activity link to a particular email causal link analysis into its determination of the threat risk parameter.

The cyber-threat defense system 100 uses various probes to collect activity, such as the user activity and the email activity, and then feeds that activity to the data store and as needed to the cyber threat module and the machine learning models. The cyber threat module uses the collected data to draw an understanding of the email activity and user activity in the email system as well as update a training for the one or more machine learning models trained on this email system and its users. For example, email traffic can be collected by putting hooks into the e-mail application, such as Outlook or Gmail, and/or monitoring the internet gateway from which the e-mails are routed through. Additionally, probes may collect network data and metrics via one of the following methods: port spanning the organizations existing network equipment; inserting or re-using an in-line network tap, and/or accessing any existing repositories of network data (e.g. See FIG. 2).

The cyber-threat defense system 100 may use multiple user interfaces. A first user interface may be constructed to present an inbox-style view of all of the emails coming in/out of the email system and any cyber security characteristics known about one or more emails under analysis. The user interface with the inbox-style view of emails has a first window/column that displays the one or more emails under analysis and a second window/column with all of the relevant security characteristics known about that email or set of emails under analysis. The complex machine learning techniques determine anomaly scores which describe any deviation from normal that the email represents, these are rendered graphically in a familiar way that users and cyber professionals can recognize and understand.

The cyber-threat defense system 100 can then take actions to counter detected potential cyber threats. The autonomous response module, rather than a human taking an action, can be configured to cause one or more rapid autonomous actions to be taken to contain the cyber threat when the threat risk parameter from the cyber threat module is equal to or above an actionable threshold. The cyber threat module's configured cooperation with the autonomous response module, to cause one or more autonomous actions to be taken to contain the cyber threat, improves computing devices in the email system by limiting an impact of the cyber threat from consuming unauthorized CPU cycles, memory space, and power consumption in the computing devices via responding to the cyber-threat without waiting for some human intervention. The cyber-threat defense system 100 may be hosted on a device, on one or more servers, and/or in its own cyber-threat appliance platform (e.g. see FIG. 2).

FIG. 2 illustrates a block diagram of an embodiment of the cyber threat defense system monitoring email activity and network activity to feed this data to correlate causal links between these activities to supply this input into the cyber threat analysis. The network can include various computing devices such as desktop units, laptop units, smart phones, firewalls, network switches, routers, servers, databases, Internet gateways, the cyber-threat defense system 100, etc.

The network module uses the probes to monitor network activity and can reference the machine learning models trained on a normal behavior of users, devices, and interactions between them or the internet which is subsequently tied to the email system.

The user interface has both i) one or more windows to present/display network data, alerts, and events, and ii) one or more windows to display email data, alerts, events, and cyber security details about those emails through the same user interface on a display screen. These two sets of information shown on the same user interface on the display screen allows a cyber professional to pivot between network data and email cyber security details within one platform, and consider them as an interconnected whole rather than separate realms.

The network module and its machine learning models are utilized to determine potentially unusual network activity in order to provide an additional input of information into the cyber threat module in order to determine the threat risk parameter (e.g. a score or probability) indicative of the level of threat.

A particular user's network activity can be tied to their email activity because the network module observes network activity and the network & email coordinator module receives the network module observations to draw that into an understanding of this particular user's email activity to make an appraisal of potential email threats with a resulting threat risk parameter tailored for different users in the e-mail system. The network module tracks each user's network activity and sends that to the network & email coordinator component to interconnect the network activity and email activity to closely inform one-another's behavior and appraisal of potential email threats.

The cyber threat defense system 100 can now track possible malicious activity observed by the network module on an organization's network back to a specific email event observed by the e-mail module, and use the autonomous rapid response module to shut down any potentially harmful activity on the network itself, and also freeze any similar email activity triggering the harmful activity on the network.

The probes collect the user activity as well as the email activity. The collected activity is supplied to the data store and evaluated for unusual or suspicious behavioral activity, e.g. alerts, events, etc., which is evaluated by the cyber threat module to draw an understanding of the email activity and user activity in the email system. The collected data can also be used to potentially update the training for the one or more machine learning models trained on the normal pattern of life for this email system, its users and the network and its entities.

An example probe for the email system may be configured to work directly with an organization's email application, such as an Office 365 Exchange domain and receive a Blind Carbon Copy (BCC) of all ingoing and outgoing communications. The email module will inspect the emails to provide a comprehensive awareness of the pattern of life of an organization's email usage.

FIG. 3 illustrates a block diagram of an embodiment of the cyber threat module determining a threat risk parameter that factors in how the chain of unusual behaviors correlate to potential cyber threats and 'the likelihood that this chain of one or more unusual behaviors of the email activity and user activity under analysis fall outside of derived normal benign behavior;' and thus, is malicious behavior.

The user interface 150 can graphically display logic, data, and other details that the cyber threat module goes through. The user interface 150 displays an example email that when undergoing analysis exhibits characteristics, such as header, address, subject line, sender, recipient, domain, etc. that are not statistically consistent with the normal emails similar to this one. Thus, the user interface 150 displays an example email's unusual activity that has it classified as a behavioral anomaly.

During the analysis, the email module can reference the one or more machine learning models that are self-learning models trained on a normal behavior of email activity and user activity associated with an email system. This can include various email policies and rules that are set for this email system. The cyber threat module may also reference the models that are trained on the normal characteristics of the email itself. The cyber threat module can apply these various trained machine learning models to data including metrics, alerts, events, meta data from the network module and the email module. In addition, a set of AI models may be responsible for learning the normal 'pattern of life' for internal and external address identities in connection with the rest of the network, for each email user. This enables the system to neutralize malicious emails which deviate from the normal 'pattern of life' for a given address identity for that user in relation to its past, its peer group, and the wider organization.

Next, the email module has at least a first email probe to inspect an email at the point it transits through the email application, such as Office 365, and extracts hundreds of data points from the raw email content and historical email behavior of the sender and the recipient. These metrics are combined with pattern of life data of the intended recipient, or sender, sourced from the data store. The combined set of the metrics are passed through machine learning algorithms to produce a single anomaly score of the email, and various combinations of metrics will attempt to generate notifications which will help define the 'type' of email.

Email threat alerts, including the type notifications, triggered by anomalies and/or unusual behavior of 'emails and any associated properties of those emails' are used by the cyber threat module to better identify any network events which may have resulted from an email borne attack.

In conjunction with the specific threat alerts and the anomaly score, the system may provoke actions upon the email designed to prevent delivery of the email or to neutralize potentially malicious content.

Next, the data store stores the metrics and previous threat alerts associated with each email for a period of time, for example this may be set to 27 days or more in one embodiment. This corpus of data is fully searchable from within the user interface 150 and presents an invaluable insight into mail flow for email administrators and security professionals.

Next, the cyber threat module can issue an anomaly rating even when an unusual email does not closely relate to any identifiable malicious email. This value indicates how unusual the cyber threat module considers this email to be in comparison to the normal pattern of life for the organization and the specific internal user (either inbound recipient or outbound sender).

In one embodiment, the cyber threat module considers over 750 metrics and the organizational pattern of life for unusual behavior for a window of time. For example, the cyber threat module considers metrics and the organizational pattern of life for unusual behavior and other supporting metrics for the past 7 days when computing the anomaly score, which is also factored into the final threat risk parameter.

FIG. 4 illustrates a block diagram of an embodiment of the cyber threat defense system referencing one or more machine learning models trained on gaining an understanding of a plurality of characteristics on an email itself and its related data including classifying the properties of the email and its metadata. The email module system extracts metrics from every email inbound and outbound. The user interface 150 can graphically display logic, data, and other details that the cyber-threat defense system goes through.

The cyber threat module in cooperation with the machine learning models analyzes these metrics in order to develop a rich pattern of life for the email activity in that email system. This allows the cyber threat module, in cooperation with the email module, to spot unusual anomalous emails that have bypassed/gotten past the existing email gateway defenses.

The email module detects emails whose content is not in keeping with the normal pattern of content as received by this particular recipient. An example analysis may be as follows:

To what level has the sender of this email been previously communicated with from individuals within the receiving organization?
   How closely are the recipients of this mail related to those individuals who have previously communicated with the sender?
   Is the content of this email consistent with other emails that the indented recipient sends or receives?
   If any links or attachments present in the email were to be clicked or opened by the intended recipient, would this constitute anomalous activity for that individual's normal network behavior?
   Are the email properties consistent with this particular user's recent network activities?

Thus, the cyber threat module can also reference the machine learning models trained on an email itself and its related data to determine if an email or a set of emails under analysis have potentially malicious characteristics. The cyber threat module can also factor this email characteristics analysis into its determination of the threat risk parameter.

The email module can retrospectively process an email application's metadata, such as Office 365 metadata, to gain an intimate knowledge of each of their users, and their email addresses, correspondents, and routine operations. The power of the cyber threat module lies in leveraging this unique understanding of day-to-day user email behavior, of each of the email users, in relation to their past, to their peer group, and to the wider organization. Armed with the knowledge of what is 'normal' for a specific organization and specific individual, rather than what fits a predefined template of malicious communications, the cyber threat module can identify subtle, sophisticated email campaigns which mimic benign communications and locate threats concealed as everyday activity.

Next, the email module provides comprehensive email logs for every email observed. These logs can be filtered with complex logical queries and each email can be interrogated on a vast number of metrics in the email information stored in the data store.

Some example email characteristics that can be stored and analyzed are:

Email direction: Message direction—outbound emails and inbound emails.

Send Time: The send time is the time and date the email was originally sent according to the message metadata.

Links: Every web link present in an email has its own properties. Links to web sites are extracted from the body of the email. Various attributes are extracted including, but not limited to, the position in the text, the domain, the frequency of appearance of the domain in other emails and how it relates to the anomaly score of those emails, how well that domain fits into the normal pattern of life of the intended recipient of the email, their deduced peer group and their organization.

Recipient: The recipient of the email. If the email was addressed to multiple recipients, these can each be viewed as the 'Recipients'. The known identify properties of the email recipient, including how well known the recipient was to the sender, descriptors of the volume of mail, and how the email has changed over time, to what extend the recipient's email domain is interacted with inside the network.

Subject: The email subject line.

Attachment: Every attachment associated with the message will appear in the user interface here as individual entries, with each entry interrogatable against both displayed and advanced metrics. These include, but are not limited to, the attachment file name, detected file types, descriptors of the likelihood of the recipient receiving such a file, descriptors of the distribution of files such of these in all email against the varying anomaly score of those emails.

Headers: Email headers are lines of metadata that accompany each message, providing key information such as sender, recipient, message content type for example.

The AI models may perform by the threat detection through a probabilistic change in normal behavior through the application of an unsupervised Bayesian mathematical model to detect behavioral change in computers and computer networks. The core threat detection system is termed the 'Bayesian probabilistic'. The Bayesian probabilistic approach can determine periodicity in multiple time series data and identify changes across single and multiple time series data for the purpose of anomalous behavior detection. From the email and network raw sources of data, a large number of metrics can be derived each producing time series data for the given metric.

The detectors in the cyber threat module including its network module and email module components can be discrete mathematical models that implement a specific mathematical method against different sets of variables with the target. Thus, each model is specifically targeted on the pattern of life of alerts and/or events coming from, for example, that cyber security analysis tool analyzing various aspects of the emails/coming from specific devices and/or users within a system, etc.

At its core, the cyber threat defense system 100 mathematically characterizes what constitutes 'normal' behavior in line with the normal pattern of life for that entity and organization based on the analysis of a large number/set of different measures of a device's network behavior. The cyber threat defense system 100 can build a sophisticated 'pattern of life'—that understands what represents normality for every person, device, email activity, and network activity in the system being protected by the cyber threat defense system 100.

The system may use a plurality of separate machine learning models. For example, a machine learning model may be trained on specific aspects of the normal pattern of life for entities in the system, such as devices, users, network traffic flow, outputs from one or more cyber security analysis tools analyzing the system, email characteristics etc.

Note, when the models leverage at least two different approaches to detecting anomalies: e.g. comparing each system's behavior to its own history, and comparing that system to its peers' history and/or e.g. comparing an email to both characteristics of emails and the activities and behavior of its email users, this multiple source comparison allows the models to avoid learning existing bad behavior as 'a normal' because compromised devices/users/components/ emails will exhibit behavior different to their immediate peers.

In an embodiment, the one or more models may be trained on specific aspects of these broader concepts. For example, the models may be specifically trained on associations, attachments, compliances, data loss & transfers, general, meta data, hygiene, links, proximity, spoof, type, validation, and other anomalies.

Thus, for example, a first email model can retrospectively process Office 365 metadata to gain an intimate knowledge of users, email addresses, correspondents and routine operations. Even in environments with encrypted email, the cyber defense system can derive key markers from metadata and provide valuable insights into correspondent identity, frequency of communication and potential risk.

The power of the cyber threat module lies in leveraging this unique understanding of day-to-day user email behavior in relation to their past, to their peer group, and to the wider organization. Armed with the knowledge of what is 'normal' for a specific organization and a specific email user, rather than what fits a predefined template of malicious communications, the cyber threat module can identify subtle, sophisticated email campaigns which mimic benign communications and locate threats concealed as everyday activity.

Defense System

FIG. 5 illustrates an example cyber threat defense system protecting an example network. The example network of FIG. 5 illustrates a network of computer systems 50 uses a threat detection system. The system depicted by FIG. 5 is a simplified illustration, which is provided for ease of explanation. The system 50 comprises a first computer system 10 within a building, which uses the threat detection system to detect and thereby attempts to prevent threats to computing devices within its bounds.

The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices including server 30 and second computer system 40. The second computer system 40 also includes two computers 41, 42, connected by a second LAN 43.

In this exemplary embodiment of the present disclosure, computer 1 on the first computer system 10 comprises the threat detection system and therefore runs the threat detection method for detecting threats to the first computer system. As such, the computer system includes one or more processors arranged to run the steps of the process described herein, memory storage components required to store information related to the running of the process, as well as a network interface for collecting the required information. This method will now be described in detail with reference to FIG. 5.

The computer 1 builds and maintains a dynamic, everchanging model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9:30 AM and midday, and is active from about 8:30 AM until 6 PM.

The same employee virtually never accesses the employee time sheets, very rarely connects to the company's Atlanta network and has no dealings in South-East Asia. The threat detection system takes all the information that is available relating to this employee and establishes a 'pattern of life' for that person via the devices used by that person in the system, which is dynamically updated as more information is gathered. The 'normal' model of the pattern of life is used as a moving benchmark, allowing the system to spot behavior on a system that seems to fall outside of this normal pattern of life, and flags this behavior as anomalous, requiring further investigation.

The cyber defense self-learning platform uses machinelearning technology. The machine learning technology, using advanced mathematics, can detect previously unidentified threats, without rules, and automatically defend networks. Note, today's attacks can be of such severity and speed that a human response cannot happen quickly enough. Thanks to these self-learning advances, it is now possible for a machine to uncover emerging threats and deploy appropriate, real-time responses to fight back against the most serious cyber threats.

The threat detection system has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine and human activity behaviorally, at and after the point of compromise, in order to predict and catch today's increasingly sophisticated cyber-attack vectors. It is thus possible to computationally establish what is normal, in order to then detect what is abnormal.

This intelligent system is capable of making value judgments and carrying out higher value, more thoughtful tasks. Machine learning requires complex algorithms to be devised and an overarching framework to interpret the results produced. However, when applied correctly these approaches can facilitate machines to make logical, probability-based decisions and undertake thoughtful tasks.

Advanced machine learning is at the forefront of the fight against automated and human-driven cyber threats, overcoming the limitations of rules and signature-based approaches:

the machine learning learns what is normal within a network—it does not depend upon knowledge of previous attacks;

the machine learning thrives on the scale, complexity and diversity of modern businesses, where every device and person is slightly different;

the machine learning turns the innovation of attackers against them—any unusual activity is visible;

the machine learning constantly revisits assumptions about behavior, using probabilistic mathematics; and the machine learning is always up to date and not reliant on human input.

Utilizing machine learning in cyber security technology is difficult, but when correctly implemented it is extremely powerful. The machine learning means that previously unidentified threats can be detected, even when their manifestations fail to trigger any rule set or signature. Instead, machine learning allows the system to analyze large sets of data and learn a 'pattern of life' for what it sees.

Machine learning can approximate some human capabilities to machines, such as:

thought: it uses past information and insights to form its judgments;

real time: the system processes information as it goes; and self-improving: the model's machine learning understanding is constantly being challenged and adapted, based on new information.

New unsupervised machine learning therefore allows computers to recognize evolving threats, without prior warning or supervision.

Unsupervised Machine Learning

Unsupervised machine learning works things out without pre-defined labels. In the example of sorting a series of different entities, such as animals, the system would analyze the information and work out the different classes of animals. This allows the system to handle the unexpected and embrace uncertainty when new entities and classes are examined. The system does not always know what it is looking for, but can independently classify data and detect compelling patterns.

The cyber threat defense system's unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships.

The cyber threat defense system uses unique implementations of unsupervised machine learning algorithms to analyze network data at scale, intelligently handle the unexpected, and embrace uncertainty. Instead of relying on knowledge of past threats to be able to know what to look for, it is able to independently classify data and detect compelling patterns that define what may be considered to be normal behavior. Any new behaviors that deviate from those, which constitute this notion of 'normality,' may indicate threat or compromise. The impact of the cyberthreat defense system's unsupervised machine learning on cyber security is transformative:

threats from within, which would otherwise go undetected, can be spotted, highlighted, contextually prioritized and isolated using these algorithms;

the application of machine learning has the potential to provide total network visibility and far greater detection levels, ensuring that networks have an internal defense mechanism; and machine learning has the capability to learn when to action automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine learning is extremely complex and difficult to get right. Robust, dependable algorithms are developed, with a scalability that enables their successful application to real-world environments.

Overview

In an embodiment, a closer look at the cyber threat defense system's machine learning algorithms and approaches is as follows.

The cyber threat defense system's probabilistic approach to cyber security is based on a Bayesian framework. This allows it to integrate a huge number of weak indicators of potentially anomalous network behavior to produce a single clear measure of how likely a network device is to be compromised. This probabilistic mathematical approach provides an ability to understand important information, amid the noise of the network—even when it does not know what it is looking for.

Ranking Threats

Advantageously, the cyber threat defense system's approach accounts for the inevitable ambiguities that exist in data, and distinguishes between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner and prioritize those that most urgently require action, simultaneously removing the problem of numerous false positives associated with a rule-based approach.

The cyber threat defense system mathematically characterizes what constitutes 'normal' behavior based on the analysis of a large number/set of different measures of a devices network behavior, examples include:

server access;

data access;

timings of events;

credential use;

DNS requests; and other similar parameters.

Each measure of network behavior is then monitored in real time to detect anomalous behaviors.

Clustering

To be able to properly model what should be considered as normal for a device, its behavior must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix based clustering, density based clustering and hierarchical clustering techniques. The resulting clusters are then used to inform the modeling of the normative behaviors of individual devices.

Clustering: At a glance:

analyzes behavior in the context of other similar devices on the network;

algorithms identify naturally occurring groupings of devices—impossible to do manually; and simultaneously runs a number of different clustering methods to inform the models.

Network Topology

Any cyber threat detection system preferably recognizes that a network is far more than the sum of its individual parts, with much of its meaning contained in the relationships among its different entities, and that complex threats can often induce subtle changes in this network structure. To capture such threats, the cyber-threat defense system employs several different mathematical methods in order to be able to model multiple facets of a networks topology.

One approach is based on iterative matrix methods that reveal important connectivity structures within the network. In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise LAN, WAN and Cloud is difficult because both input and output can contain many inter-related features (protocols, source and destination machines, log changes and rule triggers, etc.). Learning a sparse and consistent structured predictive function is crucial to avoid the curse of over fitting.

In this context, the cyber threat defense system has employed a cutting edge large-scale computational approach to learn sparse structure in models of network behavior and connectivity based on applying L1-regularization techniques (e.g. a lasso method). This allows for the discovery of true associations between different network components and events that can be cast as efficiently solvable convex optimization problems and yield parsimonious models.

Recursive Bayesian Estimation

The unsupervised machine learning methods can use a probabilistic approach based on a Bayesian framework. The machine learning allows the cyber security appliance 100 to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network—even when it does not know what it is looking for.

The cyber security appliance 100 can use a Recursive Bayesian Estimation. To combine these multiple analyses of different measures of network behavior to generate a single overall/comprehensive picture of the state of each device, the threat defense system takes advantage of the power of Recursive Bayesian Estimation (RBE) via an implementation of the Bayes filter. Using RBE, the cyber threat defense system's mathematical models are able to constantly adapt themselves, in a computationally efficient manner, as new information becomes available to the system. They continually recalculate threat levels in the light of new evidence, identifying changing attack behaviors where conventional signature-based methods fall down.

Training a model can be accomplished by having the model learn good values for all of the weights and the bias for labelled examples created by the system. In some cases, the system may start with no labels initially. A goal of the training of the model can be to find a set of weights and biases that have low loss, on average, across all examples.

An anomaly detection technique that can be used is supervised anomaly detection that requires a data set that has been labelled as "normal" and "abnormal" and involves training a classifier. Another anomaly detection technique that can be used is an unsupervised anomaly detection that detects anomalies in an unlabeled test data set under the assumption that the majority of the instances in the data set are normal, by looking for instances that seem to fit least to the remainder of the data set. The model representing normal behavior from a given normal training data set can detect anomalies by establishing the normal pattern and then test the likelihood of a test instance under analysis to be generated by the model. Anomaly detection can identify rare items, events or observations which raise suspicions by differing significantly from the majority of the data, which includes rare objects as well as things like unexpected bursts in activity.

Likely Recipient Classifier

In a further aspect of the present disclosure, a cyber threat risk detection platform of the cyber threat protection system may be configured to analyze draft emails prior to sending by a user of the system. In particular, an apparatus 160 may comprise a Likely Recipient Classifier 162, one or more machine learning models 164, an autonomous response module 166, and a user interface 168.

The apparatus 160 may be configured to process the draft email/email for sending in order to verify or otherwise authenticate a recipient of one or more recipients entered into the "Recipient" field/"To" field of the draft email. In this manner, the apparatus 160 may act to reduce the likelihood of an outbound email being sent to an unintended recipient and to prevent any associated cyber threat risk, for example the unintended disclosure of confidential or otherwise sensitive information.

As discussed above, this aspect of the present disclosure may be applied to any structured document that is to be sent by a sender to an addressed recipient. While the following disclosure will be discussed in relation to the example of emails and an email system, further examples of structured documents that the present disclosure also applies to include, but are not limited to, instant messages, text messages and other structured electronic communications.

Accordingly, in one embodiment a Likely Recipient Classifier 162 may be arranged to analyze a plurality of emails that have been sent from a sending user to a given recipient. This given recipient may be an individual email address, or alternatively the recipient may be considered to be any email address within a given domain—for example any email address associated with a given company/organization. The given recipient may be considered to be a label/class/category identifying the outbound emails that are sent to that recipient email address. A plurality of metrics/characteristics may be extracted from each email (including its related data). The one or more machine learning models 164 may then be trained to identify which particular metrics/characteristics of an email (including any related data) can be considered, when taken alone or in combination, to be strong indicators that the email has been or will be addressed to a given recipient.

The set of strong indicators may be characteristics that are common in emails addressed to the given recipient but rarely found in emails addressed to alternative recipients, or alternatively rare characteristics that are not found for alternative recipients, and they may be referred to as "key indicators". The more often/higher the frequency of occurrence of these characteristics in emails addressed to the given recipient, then the more weight is given to those specific characteristics in the key indicators. Similarly, the rarer the characteristics are, then the more weight is given to those specific characteristics in the key indicators.

Once the one or more machine learning models 164 have been trained on the past emails sent by the sender to various recipients, these trained models may be used by the Likely Recipient Classifier 162 to parse and process characteristics extracted from a previously unseen draft email to be sent by the sender in order to infer an expected recipient of that draft email. This processing may check for matches (for example using k-means clustering) between the characteristics extracted from the draft email and the key indicators that have been identified for the recipients that the sender has previously sent emails to and are therefore known recipients to the sender. By considering each of these known recipients in turn and determining a score associated with the probability of a match between the characteristics extracted from the draft email and the key identifiers for each known recipient, the Likely Recipient Classifier may determine the known recipient with the highest probability of a match for the draft email, who may be referred to as the expected recipient.

The autonomous response module 166 may obtain the expected recipient (having the highest determined probability of a match) from the Likely Recipient Classifier 162 and, where the sender has not yet indicated a recipient in the "To" field of the email, the autonomous response module may cause an alert to be displayed to the sender on the user interface 168, where the alert provides a recommendation or suggestion for the expected recipient to be entered into the "To" field of the draft email.

Where at least one recipient has already been indicated by the sender in the "To" field of the draft email, the autonomous response module 166 may compare the probability of a match for the draft email with the indicated recipient and the expected recipient. If the indicated recipient is determined to have a probability score that is lower than the expected recipient, then the autonomous response module may cause an alert to be displayed to the sender on the user interface 168, where the alert indicates that the expected recipient has been determined to have a better match to the email characteristics than the indicated recipient. This alert may also provide a recommendation or suggestion for the indicated recipient to be replaced with the expected recipient in the "To" field of the draft email. The sender can then review this alter and decide whether to accept the recommendation or whether to ignore/dismiss the alert. If the alert recommendation is accepted then the autonomous response module may cause the expected recipient to replace the indicated recipient in the "To" field of the draft email without further input from the sender/user. If the alert recommendation is dismissed, then this dismissal may be recorded in a log associated with the autonomous response module 166.

The alert recommendation may also be accompanied by an indication of the logic why the Likely Recipient Classifier 162 has provided the recommendation, for example one or more of the relevant key identifiers may be displayed to the sender user.

In some embodiments, where an alert recommendation is generated, the apparatus 160 may be configured to prevent the draft email from being sent until the sender has either accepted or dismissed the alert recommendation.

The apparatus 160 may be configured to process the draft email while continually or periodically while it is being written. Alternatively, the processing of the draft email may be deferred until the draft email has been completed and it is ready to send.

The metrics extracted from the emails by the apparatus 160 may include characteristics relating to aspects of the language content of the email, such as the constituent words and/or phrases in a body text of the email, or in the subject line, the name/file type/or content of an attachment if present.

By performing this machine learning model training for emails from a given sender to a plurality of recipients, the one or more machine learning models can learn and refine/filter these key indicators to enable the one or more machine learning models 164 to identify the words or terms that the particular sender frequently uses in emails to one recipient relative to the other recipients that the sender has previously sent emails to. In this manner, the training may filter out words or terms that the sender uses frequently with many or with a majority of recipients, since these words would not be strong or key indicators for any one particular recipient.

Once the characteristics have been extracted from the email and its related data, a first pre-processing step may be performed to reduce the words to their word stem. Stemming inflected words in this manner results in an improved efficiency of training and subsequent classification because the total number of word stems from an email will typically be less than the total number of different words present in the unprocessed email. However, this stemming process has also been found to improve the accuracy of the classification since this prevents the use of a variety of inflections of a given word stem from reducing the relative strength of that word stem/set of word inflections in being an effective key indicator for the identity of the intended recipient of an email written by the given sender.

The training data set preferably includes all emails that the sender has sent to any recipient within a given timeframe, for example this may include all emails sent by the sender that are still accessible to the apparatus 160, taking into account document retention policies. Advantageously, the training of the one or more machine learning modules may also be updated periodically with further training data, i.e. including the emails sent by the sender since the last update. This enlarged data set serves to improve the classification accuracy of the Likely Recipient Classifier 162 and also enables the apparatus 160 to adapt to any changes in the email style of the sender. In one example embodiment, this updated training may be performed daily; however it will be appreciated that alternative periodicities may also be selected without departing from the scope of the present disclosure.

While training, and updating, the Likely Recipient Classifier 162 on a set of training data corresponding to emails sent by a single sender results in an accurate classifier for further emails sent by that sender, this also serves to limit the potential size of the training data set. This may result in some words being identified as being a key indicator for a given recipient (based on the relatively small sample size of the past emails sent by the sender) when in reality the word is actually too common to be a key indicator that can reliably identify any particular recipient.

In order to combat this, the training of the one or more machine learning models may include filtering out words or terms that have been identified as common from a much larger (generic) training data set of emails that is not limited to those sent by any individual sender. For example, this larger generic training data set may include hundreds of thousands of previous emails. For performing this filtering processing of the words/key indicators during the periodic training of the machine learning models, an extensive bloom filter (or set of bloom filters) may be used to enable the apparatus 160 to make an efficient probabilistic determination of whether a given word or key identifier identified during the training is in the set(s) of common words determined from the generic training data set.

However, the inventors have also appreciated that it might be desirable to not filter out some of the terms that appear fairly common from the generic training data set. For example, while some terms might be used in emails addressed to a number of different recipients, in some cases these recipients may all be in the same industry and accordingly the term may actually be a strong indicator for that industry. When included in the key indicators for a given sender, such industry specific terms may still contribute to the accuracy of the classification. In order to achieve this, the relatedness of different organizations/domains within the generic training data set may be taken into account when determining whether such terms should be filtered out to prevent them from being used as key indicators.

In some embodiments, the alert recommendation may only be displayed to the sender if the probability score for the indicated recipient is at least a certain amount lower than the probability score for the expected recipient, i.e. if the probability score for the expected recipient is at least a certain amount higher than the probability score for the indicated recipient. This threshold amount may be set to prevent false alerts from being displayed to the sender in the event that there is only a marginal difference in the relative probability scores for the match.

Further Likely Recipient Classifiers may be trained for other senders, some of whom may be associated with the same network or organization as the given sender/user. In some embodiments, the Likely Recipient Classifier 162 may take into account key indicator information from other senders that are from the same network as the user when determining the alert to be displayed to the user for a given draft email. This may improve the alert recommendations provided to the user by considering terms or words that the user in question may not have used (or at least not commonly) for a particular recipient in the past, but that others on the network have sent to a particular indicated recipient. This may be used to avoid wrongly suggesting the user's indicated recipient should be changed. This may also be used to propose a recipient that the particular user has never messaged, but others on their network have, especially if the machine learning model training indicates that the term(s) or word(s) are unique to that unknown recipient.

In a further embodiment, the characteristics extracted from the emails for training the one or more machine learning models 164 and for classifying unseen emails by the Likely Recipient Classifier 162 may include the other recipients of the email/other indicated recipients of the draft email respectively. In this manner, common groups of recipients that are frequently seen together in emails sent by the sender may be taken into account when determining the corresponding alert recommendation.

A computer implemented method for determining and acting on a cyber threat risk of an email to be sent from a sender to an indicated recipient may also be provided in accordance with the present disclosure. At step S1, the email may be received and parsed at the Likely Recipient Classifier 162 to extract a plurality of characteristics from it. At step S2, the Likely Recipient Classifier 162 may access and use one or more machine learning models 164 that have been trained on the classification of emails with one or more of a plurality of recipients known to the sender, based on a plurality of characteristics of the emails. In particular, the Likely Recipient Classifier 162 classifies the email by determining a set of respective match probability scores between the extracted plurality of characteristics and each of the known recipients, including the indicated recipient. At step S3, the autonomous response module 166 determines an expected recipient corresponding to the known recipient having the highest probability of a match. Then at step S4, if the indicated recipient is not the expected recipient, the autonomous response module 166 causes an alert to be displayed to the sender on the sender user interface 178 indicating that the expected recipient has a higher probability of a match with the email than the indicated recipient.

Further embodiments of this computer implemented method are set out in clauses 23 to 33 below.

Inducement Classifier

In another aspect of the present disclosure, the cyber threat detection system may be configured to analyze incoming emails received at the cyber threat detection system in order to detect and act upon emails that are classified as being malign or malicious. In particular, an apparatus 170 may comprise an Inducement Classifier 172, one or more machine learning models 174, an autonomous response module 176, and a user interface 178.

The apparatus 170 may be configured to parse and process incoming emails for detecting when an email attempts, by its content (including any embedded links, attachments, photos etc.), to 'induce' a certain behavior in the recipient of the email. In this manner, the apparatus 170 may act to identify malign emails such that one or more automated actions may be performed to neutralize any associated cyber threat risk.

As discussed above, this aspect of the present disclosure may be applied to any structured document with defined fields that has been sent to the user by a sender. While the following disclosure will be discussed in relation to the example of emails and an email system, further examples of structured documents that the present disclosure also applies to include, but are not limited to, instant messages, text messages and other structured electronic communications.

Accordingly, in one embodiment an Inducement Classifier 172 may be arranged to analyze an email that has been sent to the user by a given email sender to extract a plurality of characteristics from the email, and to classify the email based upon the extracted plurality of characteristics. The fields of the email that are analyzed may include the body text of the email, the subject line, the sender field, attachment names, etc. The plurality of characteristics preferably relate to the tone and/or content of the email such that the email can be classified into one of a plurality of categories of email type. The categories of email type may relate to the type of behavior requested of the recipient by the email.

In one embodiment, the Inducement Classifier 172 achieves the analysis and subsequent classification of the email under analysis using a multiple-pronged approach comprising:

considering extracted characteristics relating to the content of the email using word analysis;

considering extracted characteristics relating to the tone of the email using structure analysis; and considering the type of induced behavior that is determined to be requested of the recipient.

However, it will be appreciated that similar classification could be achieved using only word analysis for example. The word analysis aims to identify key words or phrases that may be associated with each inducement category, but that rarely occur in emails that would not be categorized as malign. For example this may be by comparing the relative frequency density of such words and phrases in respective emails. The words and phrases considered may include the name and/or content of an attachment to the email if one exists.

In one example, the frequency density may be compared for one word phrases, two word phrases, three word phrases, or any combination of these. Each of the words in these phrases are preferably pre-processed to reduce the words to their corresponding word stem. Stemming inflected words in this manner results in an improved efficiency of training and subsequent classification in the apparatus 170 because the total number of word stems from an email will typically be less than the total number of different words present in the unprocessed email. However, this stemming process has also been found to improve the accuracy of the classification since this stemming focusses the analysis on the core meaning of the word phrase rather than any distribution of the various inflections of a given word stem used.

In one embodiment, this may be achieved using a k-means model applied to a modified Term Frequency-Inverse Document Frequency extraction from certain subsets of this metadata to determine how important a specific word, feature or phrase is.

The one or more machine learning models 174 may be trained using a training data set comprising example emails that have been labelled with each of the categories to be classified.

The Inducement Classifier 172 may be an ensemble of instructions that takes in the characteristics/metrics and then outputs a prediction about the category of the email being analyzed. The Inducement Classifier 172 may use a hypothesis learned by a machine learning algorithm or a discrete-valued function.

In one embodiment, the malign categories of emails that may represent a cyber threat risk may include one or more of "extortion", "phishing", "solicitation", "commercial spam", "other spam" and "other".

For example, an extortion email typically uses words and/or links in the body of the email to attempt to induce fear and/or embarrassment in the recipient and includes words directed to the extraction, typically by blackmail, of some sort of payment from the email recipient.

In another example, a solicitation email typically uses words in the email body text to cause or encourage the recipient to purchase, for the benefit of the sender of the email, a product or service discussed in the body of the email or in an embedded link in the email.

Once the one or more machine learning models 174 have been trained on the labelled example email training data set(s), these trained models may be used by the Inducement Classifier 172 to parse and process characteristics extracted from a previously unseen incoming email received by the user in order to infer the category that should be associated with that incoming email, along with a score associated with the probability of a match between the email characteristics and the respective categories.

The autonomous response module 176 may then obtain the probability score associated with the strength of the match of the incoming email to each of the possible malign/inducement categories. If the associated probability score determined for the one or more malign categories (or an average across multiple categories) is above a threshold, the autonomous response module 176 may be configured to cause one or more autonomous actions to be taken in order to contain or neutralize the malign nature of the incoming email. For example, in one embodiment one or more actions may be taken if the probability score is 60% or higher. Further, more aggressive, actions may be configured to be taken if the probability score exceeds higher thresholds.

The autonomous response module 176 may have a library of possible response actions types and specific actions that the autonomous response module is capable of. These may include focused response actions selectable through the user interface 178 that are contextualized to autonomously act on specific email elements of a malicious email, rather than a blanket quarantine or block approach on that email, to avoid business disruption to a particular user of the email system.

The autonomous response module is able to take measured, varied actions towards those email communications to minimize business disruption in a reactive, contextualized manner. In this manner, the autonomous response module works to neutralize malicious emails, and deliver preemptive protection against targeted, email-borne attack campaigns in real time.

Optionally, an indication of the logic regarding why the Inducement Classifier 172 has provided categorized the email in the way that is has may be displayed to the user on the user interface 178, for example one or more of the relevant words or terms may be displayed to the user.

FIG. 8 illustrates a block diagram of an embodiment of example autonomous actions that the autonomous response module can be configured to take without a human initiating that action. If the processing determines that a threshold has not been exceeded, then the incoming email may proceed without further action by the autonomous response module 176. However, if a threshold is exceeded then one or more of the appropriate action types may be initiated. Example actions may include one or more of the following:

Hold Message: The autonomous response module may hold the email an prevent delivery to the user or their email inbox, for example due to suspicious content or attachments. Held emails can be reprocessed and released by a user after investigation. If delivery has already been performed, then the email may be removed from the user's inbox. The original mail may be maintained in a buffered cache by the data store and can be recovered, or sent to an alternative mailbox, using a 'release' button in the user interface 178.

Lock Links: The autonomous response module replaces the URL of a link such that a click of that link will first divert the user via an alternative destination. The alternative destination may optionally request confirmation from the user before proceeding. The original link destination and original source may be subject to additional checks before the user is permitted to access the source.

Convert Attachments: The autonomous response module converts one or more attachments of the email to a safe format, for example flattening the attachment file by converting it into a PDF using image conversion. This delivers the content of the attachment to the intended recipient, but with vastly reduced risk since aspects such as macros or other automated scripts may be removed by the conversion. For attachments which are visual in nature, such as images, pdfs and Microsoft Office formats, the attachments may be processed into an image format and subsequently rendered into a PDF (in the case of Microsoft Office formats and PDFs) or into an image of the original file format (if an image). In some email systems, the email attachment may be initially removed and replaced with a notification informing the user that the attachment is undergoing processing. When processing is complete the converted attachment may be inserted back into the email.

Double Lock Links: The autonomous response module replaces the URL with a redirected email link. If the link is clicked, the user will be presented with a notification to that user that they are not permitted to access the original destination of the link. The user will be unable to follow the link to the original source, but their intent to follow the link may be recorded by the data store via the autonomous response module for a subsequent follow up with the user.

Strip Attachments: The autonomous response module strips one or more attachments of this email. Most file formats are delivered as converted attachments; file formats which do not convert to visible documents (e.g. executables, compressed types) are stripped to reduce risk. The 'Strip attachment' action will cause the system to remove the attachment from the email, and replace it with a file informing the user that the original attachment was removed.

Junk action: The autonomous response module classifies the email as junk or other malicious email and diverts it to the user's junk folder, or other nominated destination such as 'quarantine'.

Redirect: The autonomous response module may ensure the email is not delivered to the user, but is instead diverted to a specified email address.

Copy: The autonomous response module may ensure the email is delivered to the original recipient, but that a copy is also sent to another specified email address.

Do not hold or alter: For particular users, the autonomous response module may be configured to ignore actions that would otherwise be taken for other users.

Take no action on attachments: For particular users, the autonomous response module may override any attachment actions that would be otherwise taken.

Header and body action: The autonomous response module may insert specific/custom text into the email body or subject line to add to or replace existing text, images, or other content in a header and/or body of the email.

Unspoof: The autonomous response module may identify standard email header address fields (e.g. rfc822 type) and replace the personal name and the header email address with an alternative name or email address which might reveal more about the true sender of the email. This mechanism significantly reduces the psychological impact of spoof attempts.

In one embodiment, the apparatus 170 may be configured to further take into account a variety of structural metrics/characteristics for use in the training and subsequent inference stages. These structural characteristics may consider factors such as one or more of: the average length of sentences and/or paragraphs used in the email body text (derived ratio analysis), the density of numbers or capitalization in the text, the presence of phone numbers, email addresses, large round numbers (may be linked to extortion for example), words that are a combination of character types (e.g. mixing Latin letters with either numbers or non-Latin characters, such as Cyrillic), currency values (in particular cryptocurrencies) and the format of the addressing fields.

For example, an extortion/blackmail email is typically long in content with details of the blackmail compared to a solicitation email, which subsequently highlights the products or service being offered. On the contrary, a legitimate work-related email rarely requests money from the recipient unless contract negotiations are being discussed. However, the general tone and induced behavior of a work-related contract negotiation is quite different than that of a blackmail message. Moreover, attached contract terms for such a work-related email may be expected to be very lengthy compared to a blackmail email.

In the above, the Inducement Classifier 172 and the one or more machine learning models 174 may extract and analyze may different metrics/characteristics for each incoming email. In one specific example over 180 characteristics may be used for the word analysis and over 120 characteristics may be used for the structure analysis.

An overarching classification model may also be fitted using these characteristics and used to score an incoming email in the various inducement categories, which in turn may be used to calculate an overall inducement "badness" score associated with the email. In an embodiment, this overarching classifier may use a different set of training data to that used for the word analysis.

Where a given user has a history of emails from a legitimate contact that are not classified as inducement, but the user suddenly starts to receive one or more emails from the contact that are classified as inducement by the Inducement Classifier 172, then it may be inferred that the contact's email account has been hijacked or otherwise compromised. In such a situation, the system may optionally send a notification to the contact to alert them to this possible hijacking/compromise so that appropriate action may be taken.

In a further embodiment a secondary classifier may be trained on the analysis of emails based only on the structural characteristics (i.e. not also on the word characteristics). This may be particularly beneficial in circumstances where it is determined that an incoming email is written in a language that the one or more machine learning models have not been trained on, since the relevance of the structural characteristics will still hold true and may enable the system and method to calculate inducement scores of emails that are written in these languages unknown to the Inducement Classifier 172. The language may be detected, for example, using a language classifier trained to identify the language of a given piece of text.

This highlights the additional benefit of considering the structure of an email as well as it's word content when identifying emails that may be designed to induce certain bad behaviors in a receiving user, particularly because it has been appreciated that the structure of a typical solicitation, phishing, extortion etc. email may be preserved even when the language is translated. Furthermore, the emphasis on structure may also allow for topical spear-phishing (such as topical emails relating to Covid-19) in both English and Non-English emails to be identified since the classifier would not rely solely on the meaning of topical terms, which may not have been present in the training datasets.

In some embodiments, the user interface 178 may be provided with an administrative tool for the user to set which types of autonomous actions the autonomous response module is configured to perform and for setting the relevant thresholds for triggering these autonomous actions. The types of actions and specific actions that the autonomous response module 176 may be customized with may be set individually for different users and/or different parts of the system.

In one embodiment, the autonomous response module may initially be run in human confirmation mode in which all autonomous, intelligent interventions are confirmed by a human operator. As the apparatus 170 refines and nuances its understanding of an organization's email behavior, the level of autonomous action can be increased until eventually no human supervision is required for each autonomous response action. Most security teams will spend very little time in the user interface administrative tool once this level is reached. At that stage, the autonomous response module action may respond to and neutralize malicious emails without the need for any active management.

The intelligent system of the present disclosure is capable of making value judgments and carrying out higher value, more thoughtful tasks. Machine learning requires complex algorithms to be devised and an overarching framework to interpret the results produced. However, when applied correctly these approaches can facilitate machines to make logical, probability-based decisions and undertake thoughtful tasks.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine learning is extremely complex and difficult to get right. Robust, dependable algorithms are developed, with a scalability that enables their successful application to real-world environments.

A computer implemented method for determining and acting on a cyber threat risk of an email that has been sent to a user from a given sender may also be provided in accordance with the present disclosure. At step S10, the email may be received and parsed at the Inducement Classifier 172 to extract a plurality of characteristics from it. At step S11, the Inducement Classifier 172 may access and use one or more machine learning models 174 that have been trained on the classification of emails with one or more of the plurality of malign categories based on the extracted characteristics of emails, in particular, the Inducement Classifier 172 classifies the received email with one or more of the plurality of malign categories based on the extracted plurality of characteristics and the one or more machine learning models 174. At step S12, a score is determined for the probability of a match between the email characteristics and each of the plurality of malign categories. Then at step S13, the autonomous response module 176 determines whether one of these scores is above a threshold; if the score determined for the one or more malign categories is above the threshold, the autonomous response module 176 causes one or more actions to contain the malign nature of the received email to be initiated as discussed above.

Further embodiments of this computer implemented method are set out in clauses 35 to 40 below.

The method, apparatus and system are arranged to be performed by one or more processing components with any portions of software stored in an executable format on a computer readable medium. Thus, any portions of the method, apparatus and system implemented as software can be stored in one or more non-transitory memory storage devices in an executable format to be executed by one or more processors. The computer readable medium may be non-transitory and does not include radio or other carrier waves. The computer readable medium could be, for example, a physical computer readable medium such as semiconductor memory or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

A cloud provider platform may include one or more of the server computing systems. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

Computing Devices

FIG. 9 illustrates a block diagram of an embodiment of one or more computing devices that can be used in combination with the present disclosure.

The computing device may include one or more processors or processing units 620 to execute instructions, one or more memories 630-632 to store information, one or more data input components 660-663 to receive data input from a user of the computing device 600, one or more modules that include the management module, a network interface communication circuit 670 to establish a communication link to communicate with other computing devices external to the computing device, one or more sensors where an output from the sensors is used for sensing a specific triggering condition and then correspondingly generating one or more preprogrammed actions, a display screen 691 to display at least some of the information stored in the one or more memories 630-632 and other components. Note, portions of this design implemented in software 644, 645, 646 may be stored in the one or more memories 630-632 and be executed by the one or more processors 620. The processing unit 620 may have one or more processing cores, which couples to a system bus 621 that couples various system components including the system memory 630. The system bus 621 may be any of several types of bus structures selected from a memory bus, an interconnect fabric, a peripheral bus, and a local bus using any of a variety of bus architectures.

Computing device 602 typically includes a variety of computing machine-readable media. Machine-readable media can be any available media that can be accessed by computing device 602 and includes both volatile and non-volatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 602. Transitory media such as wireless channels are not included in the machine-readable media. Machine-readable media typically embody computer readable instructions, data structures, and other executable software.

In an example, a volatile memory drive 641 is illustrated for storing portions of the operating system 644, application programs 645, other executable software 646, and program data 647.

A user may enter commands and information into the computing device 602 through input devices such as a keyboard, touchscreen, or software or hardware input buttons 662, a microphone 663, a pointing device and/or scrolling input component, such as a mouse, trackball or touch pad 661. The microphone 663 can cooperate with speech recognition software. These and other input devices are often connected to the processing unit 620 through a user input interface 660 that is coupled to the system bus 621, but can be connected by other interface and bus structures, such as a lighting port, game port, or a universal serial bus (USB). A display monitor 691 or other type of display screen device is also connected to the system bus 621 via an interface, such as a display interface 690. In addition to the monitor 691, computing devices may also include other peripheral output devices such as speakers 697, a vibration device 699, and other output devices, which may be connected through an output peripheral interface 695.

The computing device 602 can operate in a networked environment using logical connections to one or more remote computers/client devices, such as a remote computing system 680. The remote computing system 680 can a personal computer, a mobile computing device, a server, a router, a network PC, a peer device or other common network node, and typically includes many or all of the elements described above relative to the computing device 602. The logical connections can include a personal area network (PAN) 672 (e.g., Bluetooth®), a local area network (LAN) 671 (e.g., Wi-Fi), and a wide area network (WAN) 673 (e.g., cellular network). Such networking environments are commonplace in offices, enterprise-wide computer networks, intranets and the Internet. A browser application and/or one or more local apps may be resident on the computing device and stored in the memory.

When used in a LAN networking environment, the computing device 602 is connected to the LAN 671 through a network interface 670, which can be, for example, a Bluetooth® or Wi-Fi adapter. When used in a WAN networking environment (e.g., Internet), the computing device 602 typically includes some means for establishing communications over the WAN 673. With respect to mobile telecommunication technologies, for example, a radio interface, which can be internal or external, can be connected to the system bus 621 via the network interface 670, or other appropriate mechanism. In a networked environment, other software depicted relative to the computing device 602, or portions thereof, may be stored in the remote memory storage device. By way of example, and not limitation, remote application programs 685 as reside on remote computing device 680. It will be appreciated that the network connections shown are examples and other means of establishing a communications link between the computing devices that may be used.

It should be noted that the present design can be carried out on a computing device such as that described with respect to FIG. 9. However, the present design can be carried out on a server, a computing device devoted to message handling, or on a distributed system in which different portions of the present design are carried out on different parts of the distributed computing system.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C++, HTTP, Java, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both. A module may be implemented in hardware electronic components, software components, and a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Generally, an application includes programs, routines, objects, widgets, plug-ins, and other similar structures that perform particular tasks or implement particular abstract data types. Those skilled in the art can implement the description and/or figures herein as computer-executable instructions, which can be embodied on any form of computing machine-readable media discussed herein.

Many functions performed by electronic hardware components can be duplicated by software emulation. Thus, a software program written to accomplish those same functions can emulate the functionality of the hardware components in input-output circuitry.

Embodiments of the above disclosure can be described with reference to the following numbered clauses, with preferred features laid out in the dependent clauses:

Clause 1. An apparatus for determining and acting on a cyber threat risk of a structured document addressed to a recipient by a sender, the apparatus comprising one or more machine learning models that are trained on the classification of structured documents with one or more of a plurality of categories based on a plurality of characteristics of the structured documents;

a classifier configured to receive a structured document for analysis and to parse the structured document to extract the plurality of characteristics of the structured document; wherein the classifier is further configured to classify the structured document with one or more of the plurality of categories based on the extracted plurality of characteristics and the one or more machine learning models, and to determine an associated score for the classification; and an autonomous response module configured to, based on a comparison of the associated score with a threshold, cause one or more autonomous actions to be taken in relation to the structured document.

Clause 2. The apparatus of clause 1, further comprising a sender user interface;

wherein the structured document is to be sent from the sender to an indicated recipient;

wherein each category of the plurality of categories represents a respective recipient of a plurality of recipients known to the sender;

wherein the associated score represents the probability of a match between the indicated recipient and the extracted plurality of characteristics;

wherein the classifier is further configured to determine one or more further scores representing the respective probability of a match between the extracted plurality of characteristics and each of the other recipients known to the sender;

wherein the threshold represents the score of an alternative recipient, of the other recipients known to the sender, having the highest probability of a match; and wherein the one or more autonomous actions comprise, if the associated score is less than the threshold, displaying an alert to the sender on the sender user interface indicating that the alternative recipient has a higher probability of a match than the indicated recipient.

Clause 3. The apparatus of clause 2, wherein one or more of the machine learning models have been trained to identify, for each recipient known to the sender, one or more indicators corresponding to characteristics that are frequently present in structured documents sent by the sender and addressed to the respective recipient known to the sender relative to those addressed to other recipients known to the sender; and wherein the classifier is configured to classify the structured document with one or more of the categories representing the plurality of recipients known to the sender by comparing the extracted plurality of characteristics with the one or more indicators for each recipient known to the sender.

Clause 4. The apparatus of clause 3, wherein the training of the one or more machine learning models is configured to be periodically updated by further training with the classification of structured documents sent by the sender since the last update.

Clause 5. The apparatus of any of clauses 2 to 4, wherein the autonomous response module is only configured to cause the alert to be displayed if the associated score is less than the threshold by more than a given amount.

Clause 6. The apparatus of any of clauses 2 to 5, wherein the autonomous response module is further configured to prevent the structured document from being sent to the indicated recipient until the alert has been acknowledged by the sender.

Clause 7. The apparatus of any of clauses 3 to 6, wherein the one or more machine learning modules have been trained to filter out indicators that are identified as common based on a structured document training data set that includes structured documents from a plurality of senders.

Clause 8. The apparatus of any of clauses 3 to 7, wherein the plurality of characteristics of the structured document comprise the constituent words and/or phrases of a body text of the structured document.

Clause 9. The apparatus of any of clauses 3 to 7, wherein the plurality of characteristics of the structured document comprise the stem of the constituent words and/or phrases of a body text of the structured document.

Clause 10. The apparatus of any of clauses 3 to 9, wherein the plurality of characteristics of the structured document further comprise additional recipients indicated in the structured document to be sent from the sender; and wherein the one or more indicators for each respective recipient known to the sender further comprise additional recipients that are frequently present in structured documents sent by the sender and addressed to the respective recipient relative to those addressed to other recipients known to the sender.

Clause 11. The apparatus of any of clauses 3 to 10, wherein the sender is associated with an organization, and wherein the classifier is further configured to classify the structured document with the one or more of the categories representing the plurality of recipients known to the sender by comparing the extracted plurality of characteristics with one or more additional indicators, the additional indicators corresponding to characteristics that are frequently present in structured documents sent by other senders associated with the organization and addressed to the respective recipients; wherein the one or more additional indicators are weighted lower than the one or more indicators in the classification.

Clause 12. The apparatus of any of clauses 3 to 10, wherein the sender is associated with an organization; wherein the classifier is further configured to classify the structured document with one or more categories representing unknown recipients that are unknown to the sender based on unique indicators corresponding to characteristics that are uniquely present in structured documents sent to the respective unknown recipients by other senders associated with the organization; and wherein the one or more autonomous actions comprise, if the score associated with the unknown recipient corresponds to the highest probability of a match, displaying an alert to the sender on the sender user interface indicating that the unknown recipient has a higher probability of a match than the indicated recipient.

Clause 13. The apparatus of any of clauses 3 to 12, wherein the autonomous response module is further configured to display, with the alert to the sender, one or more of the characteristics and/or indicators that led to the alternative recipient having a higher probability of a match.

Clause 14. The apparatus of clause 1, wherein the structured document has been sent to the user from a given sender; wherein the one or more categories comprise one or more malign categories; and wherein, when the associated score determined for the one or more malign categories is above the threshold, the one or more autonomous actions comprise one or more actions to contain the malign nature of the sent structured document.

Clause 15. The apparatus of clause 14, wherein the plurality of characteristics of the structured document comprise one or more of: the constituent words and/or phrases of a body text of the structured document, links in the structured document directing to other resources, attachments of the structured document, a format of an addressing field of the structured document; the presence of phone numbers in the body text, the presence of email addresses in the body text, the presence of currency values in the body text, and/or derived ratio analysis of aspects of text construction of the body text.

Clause 16. The apparatus of clause 15, further comprising a language classifier with one or more language machine learning models trained to identify a language of text;
   wherein the one or more of the machine learning models trained on the classification of structured documents are trained on words and/or phrases of a subset of languages;
   wherein the language classifier is configured to reference the one or more language machine learning modules to identify the language of the body text of the structured document; and wherein, if the language of the body text is determined to be a language not included in the subset of languages, the classifier is configured to classify the structured document with one or more of the plurality of categories based on the extracted plurality of characteristics excluding the constituent words and/or phrases of a body text of the structured document.

Clause 17. The apparatus of any of clauses 14 to 16, wherein the one or more actions to contain the malign nature of the received structured document comprise one or more of: preventing the delivery of the structured document to the user, removing the structured document from a user inbox;

converting one or more attachments of the structured document from one file format to another file format, removing one or more attachments of the structured document, redirecting links in the structured document to alternative destinations, removing links from the structured document, tagging the structured document as junk, redirecting or copying the structured document to another user inbox, inserting additional text into the structured document, and/or altering the content of one or more defined fields of the structured document.

Clause 18. The apparatus of any of clauses 14 to 17, further comprising a user interface having an administrative tool for setting, by a user, which types of autonomous actions the autonomous response module is configured to perform and for setting the threshold.

Clause 19. The apparatus of any of clauses 14 to 18, wherein the one or more machine learning models that are trained on the classification of structured documents comprise at least one machine learning module trained by comparing the relative frequency density of words and phrases in training data sets corresponding to each respective category.

Clause 20. The apparatus of any of clauses 14 to 19, further comprising a user interface wherein the autonomous response module is further configured to display, on the user interface, one or more of the characteristics of the structured document that led to the cause of the autonomous action.

Clause 21. A computer implemented method for determining and acting on a cyber threat risk of a structured document addressed to a recipient by a sender, the method comprising:
   using one or more machine learning models that are trained on the classification of structured documents with one or more of a plurality of categories based on a plurality of characteristics of the structured documents;
   receiving, at a classifier, a structured document for analysis and parsing the structured document to extract the plurality of characteristics of the structured document;
   classifying, at the classifier, the structured document with one or more of the plurality of categories based on the extracted plurality of characteristics and the one or more machine learning models, and determining an associated score for the classification; and
   causing, by an autonomous response module, one or more autonomous actions to be taken in relation to the structured document based on a comparison of the associated score with a threshold.

Clause 22. The computer implemented method of clause 21, wherein the structured document is to be sent from the sender to an indicated recipient; wherein each category of the plurality of categories represents a respective recipient of a plurality of recipients known to the sender; and wherein the associated score represents the probability of a match between the indicated recipient and the extracted plurality of characteristics; the computer implemented method further comprising:
   determining, by the classifier, one or more further scores representing the respective probability of a match between the extracted plurality of characteristics and each of the other recipients known to the sender; wherein the threshold represents the score of an alternative recipient, of the other recipients known to the sender, having the highest probability of a match; and
   wherein the one or more autonomous actions comprise, if the associated score is less than the threshold, displaying an alert to the sender on the sender user interface indicating that the alternative recipient has a higher probability of a match than the indicated recipient.

Clause 23. The computer implemented method of clause 22, wherein one or more of the machine learning models have been trained to identify, for each recipient known to the sender, one or more indicators corresponding to characteristics that are frequently present in structured documents sent by the sender and addressed to the respective recipient known to the sender relative to those addressed to other recipients known to the sender; and wherein the classifier classifies the structured document with one or more of the categories representing the plurality of recipients known to the sender by comparing the extracted plurality of characteristics with the one or more indicators for each recipient known to the sender.

Clause 24. The computer implemented method of clause 23, wherein the training of the one or more machine learning models is periodically updated by further training with the classification of structured documents sent by the sender since the last update.

Clause 25. The computer implemented method of any of clauses 22 to 24, wherein the autonomous response module is only configured to cause the alert to be displayed if the associated score is less than the threshold by more than a given amount.

Clause 26. The computer implemented method of any of clauses 22 to 25, wherein the autonomous response module prevents the structured document from being sent to the indicated recipient until the alert has been acknowledged by the sender.

Clause 27. The computer implemented method of any of clauses 23 to 26, wherein the one or more machine learning modules have been trained to filter out indicators that are identified as common based on a structured document training data set that includes structured documents from a plurality of senders.

Clause 28. The computer implemented method of any of clauses 23 to 27, wherein the plurality of characteristics of the structured document comprise the constituent words and/or phrases of a body text of the structured document.

Clause 29. The computer implemented method of any of clauses 23 to 27, wherein the plurality of characteristics of the structured document comprise the stem of the constituent words and/or phrases of a body text of the structured document.

Clause 30. The computer implemented method of any of clauses 23 to 29, wherein the plurality of characteristics of the structured document further comprise additional recipients indicated in the structured document to be sent from the sender; and wherein the one or more indicators for each respective recipient known to the sender further comprise additional recipients that are frequently present in structured documents sent by the sender and addressed to the respective recipient relative to those addressed to other recipients known to the sender.

Clause 31. The computer implemented method of any of clauses 23 to 30, wherein the sender is associated with an organization, and wherein the classifier classifies the structured document with the one or more of the categories representing the plurality of recipients known to the sender by comparing the extracted plurality of characteristics with one or more additional indicators, the additional indicators corresponding to characteristics that are frequently present in structured documents sent by other senders associated with the organization and addressed to the respective recipients; wherein the one or more additional indicators are weighted lower than the one or more indicators in the classification.

Clause 32. The computer implemented method of any of clauses 23 to 30, wherein the sender is associated with an organization; wherein the classifier classifies the structured document with one or more categories representing unknown recipients that are unknown to the sender based on unique indicators corresponding to characteristics that are uniquely present in structured documents sent to the respective unknown recipients by other senders associated with the organization; and wherein the one or more autonomous actions comprise, if the score associated with the unknown recipient corresponds to the highest probability of a match, displaying an alert to the sender on the sender user interface indicating that the unknown recipient has a higher probability of a match than the indicated recipient.

Clause 33. The computer implemented method of any of clauses 23 to 32, further comprising displaying with the alert to the sender, by the autonomous response module, one or more of the characteristics and/or indicators that led to the alternative recipient having a higher probability of a match.

Clause 34. The computer implemented method of clause 21, wherein the structured document has been sent to the user from a given sender; wherein the one or more categories comprise one or more malign categories; and wherein, when the associated score determined for the one or more malign categories is above the threshold, the one or more autonomous actions comprise one or more actions to contain the malign nature of the sent structured document.

Clause 35. The computer implemented method of clause 24, wherein the plurality of characteristics of the structured document comprise one or more of: the constituent words and/or phrases of a body text of the structured document, links in the structured document directing to other resources, attachments of the structured document, a format of an addressing field of the structured document; the presence of phone numbers in the body text, the presence of email addresses in the body text, the presence of currency values in the body text, and/or derived ratio analysis of aspects of text construction of the body text.

Clause 36. The computer implemented method of clause 35, further comprising a language classifier with one or more language machine learning models trained to identify a language of text; wherein the one or more of the machine learning models trained on the classification of structured documents are trained on words and/or phrases of a subset of languages; the computer implemented method further comprising:

referencing, by the language classifier, the one or more language machine learning modules to identify the language of the body text of the structured document; and wherein, if the language of the body text is determined to be a language not included in the subset of languages, classifying the structured document with one or more of the plurality of categories based on the extracted plurality of characteristics excluding the constituent words and/or phrases of a body text of the structured document.

Clause 37. The computer implemented method of any of clauses 34 to 36, wherein the one or more actions to contain the malign nature of the received structured document comprise one or more of: preventing the delivery of the structured document to the user, removing the structured document from a user inbox; converting one or more attachments of the structured document from one file format to another file format, removing one or more attachments of the structured document, redirecting links in the structured document to alternative destinations, removing links from the structured document, tagging the structured document as junk, redirecting or copying the structured document to another user inbox, inserting additional text into the structured document, and/or altering the content of one or more defined fields of the structured document.

Clause 38. The computer implemented method of any of clauses 34 to 37, wherein the threshold and the types of autonomous actions the autonomous response module perform are set by a user in a user interface having an administrative tool.

Clause 39. The computer implemented method of any of clauses 34 to 38, wherein the one or more machine learning models that are trained on the classification of structured documents comprise at least one machine learning module trained by comparing the relative frequency density of words and phrases in training data sets corresponding to each respective category.

Clause 40. The computer implemented method of any of clauses 34 to 39, further comprising displaying one or more of the characteristics of the structured document that led to the cause of the autonomous action on a user interface.

Clause 41. A non-transitory computer readable medium including executable instructions that, when executed with one or more processors, cause a cyber defense system to perform the operations of clause 21.

In one aspect of the disclosure, an apparatus for determining and acting on a cyber threat risk of a structured document to be sent from a sender to an indicated recipient is provided, the apparatus comprising:

one or more machine learning models that are trained on the classification of structured documents, with one or more of a plurality of recipients known to the sender, based on a plurality of characteristics of the structured documents;

a classifier configured to receive a structured document for analysis and to parse the structured document to extract the plurality of characteristics of the structured document; and to use the one or more machine learning models to classify the structured document by determining a set of respective match probability scores between the extracted plurality of characteristics and each of the known recipients, including the indicated recipient;

a sender user interface; and an autonomous response module configured to, determine an expected recipient corresponding to the known recipient having the highest probability of a match; and, if the indicated recipient is not the expected recipient, to cause an alert to be displayed to the sender on the sender user interface indicating that the expected recipient has a higher probability of a match with the structured document than the indicated recipient.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. An apparatus for determining and acting on a cyber threat risk of a structured document addressed to an indicated recipient by a sender, the apparatus, including a hardware processor and one or more non-transitory storage mediums configured to store instructions executable by the hardware processor and associated with one or more machine learning modules, a classifier and an autonomous response module, comprising:

the one or more machine learning models that are trained on a classification of structured documents with one or more of a plurality of categories based on a plurality of characteristics of the structured documents;

the classifier configured to receive a first structured document addressed to the indicated recipient for analysis and to parse the first structured document to extract the plurality of characteristics of the first structured document; wherein the classifier is further configured to cooperate with the one or more machine learning models to classify the first structured document with one or more of the plurality of categories based on the extracted plurality of characteristics of the first structured document, and then to determine an associated score for the classification, where the first structured document is an outbound electronic communication from an account of the sender selected from a group consisting of an email, an instant message, a text message, or other structured electronic communication, wherein the classifier is further configured to cooperate with one or more of the one or more machine learning models that has been further trained to identify, for each recipient known to the sender, one or more indicators corresponding to characteristics that are frequently present in the plurality of structured documents sent by the sender and addressed to 1) the indicated recipient known to the sender relative to 2) those structured documents addressed to other recipients known to the sender; and thus, the determined associated score from the classifier then indicates a degree of association with between the first structured document and the indicated recipient compared to structured documents addressed to other potential recipients known to the sender;

the autonomous response module configured to, based on the comparison of the associated score with a threshold, cause one or more autonomous actions to be taken in relation to the first structured document, where when a first recipient other than the indicated recipient is determined to have a best association with respect to the extracted characteristics of the first structured document, then the autonomous response module is configured to bring this to an attention of the sender of the first structured document by displaying an alert on a user interface to the sender;

wherein the one or more machine learning models, the classifier, and the autonomous response module cooperate to improve a computing device by limiting a consumption of central processing unit (CPU) cycles, memory space, and power consumption in the computing device via generating and sending of the first structured document to an unintended recipient.

2. The apparatus of claim 1, further comprising a sender user interface;

wherein each category of the plurality of categories represents a respective recipient of a plurality of recipients known to the sender;

wherein the associated score represents a probability of a match between the indicated recipient and the extracted plurality of characteristics of the first structured document;

wherein the classifier is further configured to determine one or more further scores representing a respective probability of a match between the extracted plurality of characteristics and each of the other recipients known to the sender;

wherein the threshold represents a score of an alternative recipient, of the other recipients known to the sender, having a highest probability of a match; and wherein the one or more autonomous actions comprise, when the associated score is less than the threshold, displaying the alert to the sender on the sender user interface indicating that the alternative recipient has a higher probability of a match than the indicated recipient.

3. The apparatus of claim 2, wherein the autonomous response module is further configured to prevent the first structured document from being sent to the indicated recipient until the alert has been acknowledged by the sender.

4. The apparatus of claim 1, wherein the plurality of characteristics of the first structured document comprise a stem of constituent words and/or phrases of a body text of the first structured document.

5. The apparatus of claim 1, wherein the plurality of characteristics of the first structured document comprise additional recipients indicated in the first structured document to be sent from the account of the sender; and wherein the one or more indicators for each respective recipient known to the sender further comprise additional recipients that are frequently present in the plurality of structured documents sent by the sender.

6. The apparatus of claim 1, wherein the sender is associated with an organization; wherein the classifier is further configured to classify the first structured document with one or more categories representing unknown recipients that are unknown to the sender based on unique indicators corresponding to characteristics that are uniquely present in structured documents sent to respective unknown recipients by other senders associated with the organization; and wherein the one or more autonomous actions comprise, when a score associated with the respective unknown recipient corresponds to a highest probability of a match, where the autonomous response module is further configured to display the alert to the sender on the user interface indicating that the respective unknown recipient has a higher probability of a match than the indicated recipient.

7. The apparatus of claim 1, wherein the autonomous response module is further configured to display, with the alert to the sender, one or more of the characteristics and/or indicators that led to the first recipient having a higher probability of a match.

8. The apparatus of claim 1, wherein a second structured document has been sent to a user from a given sender; wherein the one or more categories comprise one or more malign categories; and wherein, when the associated score determined for the one or more malign categories is above the threshold, the one or more autonomous actions comprise one or more actions to contain a malign nature of the sent second structured document.

9. The apparatus of claim 8, wherein the plurality of characteristics of the second structured document comprise one or more of: the constituent words and/or phrases of a body text of the second structured document, links in the second structured document directing to other resources, attachments of the second structured document, a format of an addressing field of the second structured document; the presence of phone numbers in the body text, the presence of email addresses in the body text, the presence of currency values in the body text, and/or derived ratio analysis of aspects of text construction of the body text in the second structured document.

10. The apparatus of claim 9, further comprising a language classifier with one or more language machine learning models trained to identify a language of text;

wherein the one or more of the machine learning models trained on the classification of structured documents are trained on words and/or phrases of a subset of languages;

wherein the language classifier is configured to reference the one or more language machine learning modules to identify the language of the body text of the second structured document; and wherein, if the language of the body text is determined to be a language not included in the subset of languages, the classifier is configured to classify the second structured document with one or more of the plurality of categories based on the extracted plurality of characteristics excluding the constituent words and/or phrases of a body text of the second structured document.

11. The apparatus of claim 8, wherein the one or more actions to contain the malign nature of the received structured document comprise one or more of: converting one or more attachments of the structured document from one file format to another file format, removing one or more attachments of the second structured document, redirecting links in the second structured document to alternative destinations, removing links from the second structured document, tagging the second structured document as junk, redirecting or copying the second structured document to another user inbox, inserting additional text into the second structured document, and/or altering the content of one or more defined fields of the second structured document.

12. The apparatus of claim 8, further comprising a user interface having an administrative tool for setting, by a user, which types of autonomous actions the autonomous response module is configured to perform and for setting the threshold;

wherein the autonomous response module is further configured to display, on the user interface, one or more of the characteristics of the structured document that led to the cause of the autonomous action.

13. The apparatus of claim 8, wherein the one or more machine learning models that are trained on the classification of structured documents comprise at least one machine learning module trained by comparing the relative frequency density of words and phrases in training data sets corresponding to each respective category.

14. A computer implemented method for determining and acting on a cyber threat risk of a structured document addressed to an indicated recipient by a sender, the method comprising:

using one or more machine learning models that are trained on the classification of structured documents with one or more of a plurality of categories based on a plurality of characteristics of the structured documents;

receiving, at a classifier, a structured document for analysis and parsing a first structured document addressed to the indicated recipient to extract the plurality of characteristics of the first structured document, where the first structured document is an outbound electronic communication from an account of the sender selected from a group consisting of an email, an instant message, a text message, or other structured electronic communication;

classifying, at the classifier, the first structured document with one or more of the plurality of categories based on the extracted plurality of characteristics of the first structured document and referencing the one or more machine learning models, and determining an associated score for the classification of first structured document;

using one or more of the one or more machine learning models that has been further trained to identify, for each recipient known to the sender, one or more indicators corresponding to characteristics that are frequently present in the plurality of structured documents sent by the sender and addressed to 1) the indicated recipient known to the sender relative to 2) those structured documents addressed to other recipients known to the sender, causing the determined associated score from the classifier to then indicate a degree of association with between the first structured document and the indicated recipient compared to structured documents addressed to other potential recipients known to the sender, causing, by an autonomous response module, one or more autonomous actions to be taken in relation to the first structured document based on a comparison of the associated score with a threshold, bringing to an attention of the sender of the first structured document, by the autonomous response module, when a first recipient other than the indicated recipient is determined to have a best association with respect to the extracted characteristics of the first structured document and displaying an alert on the first recipient on a user interface to the sender, using the one or more machine learning models, the classifier, and the autonomous response module cooperate to improve a computing device by limiting a consumption of central processing unit (CPU) cycles, memory space, and power consumption in the computing device via preventing a generation and sending of the first structured document to an unintended recipient, wherein any software instructions utilized by the one or more machine learning models, the classifier, and the autonomous response module are stored on one or more non-transitory storage mediums in an executable state to be executed by one or more processor units.

15. The computer implemented method of claim 14, wherein the structured document is to be sent from the sender to an indicated recipient;

wherein each category of the plurality of categories represents a respective recipient of a plurality of recipients known to the sender; and wherein the associated score represents the probability of a match between the indicated recipient and the extracted plurality of characteristics; the computer implemented method further comprising:

determining, by the classifier, one or more further scores representing the respective probability of a match between the extracted plurality of characteristics and each of the other recipients known to the sender; wherein the threshold represents the score of an alternative recipient, of the other recipients known to the sender, having the highest probability of a match; and wherein the one or more autonomous actions comprise, if the associated score is less than the threshold, displaying an alert to the sender on the sender user interface indicating that the alternative recipient has a higher probability of a match than the indicated recipient.

16. The computer implemented method of claim 15, wherein one or more of the machine learning models have been trained to identify, for each recipient known to the sender, one or more indicators corresponding to characteristics that are frequently present in structured documents sent by the sender and addressed to the respective recipient known to the sender relative to those addressed to other recipients known to the sender; and wherein the classifier classifies the structured document with one or more of the categories representing the plurality of recipients known to the sender by comparing the extracted plurality of characteristics with the one or more indicators for each recipient known to the sender.

17. The computer implemented method of claim 16, wherein the plurality of characteristics of the structured document comprise the stem of the constituent words and/or phrases of a body text of the structured document.

18. The computer implemented method of claim 14, wherein the structured document has been sent to the user from a given sender; wherein the one or more categories comprise one or more malign categories; and wherein, when the associated score determined for the one or more malign categories is above the threshold, the one or more autonomous actions comprise one or more actions to contain the malign nature of the sent structured document.

19. A non-transitory computer readable medium including executable instructions that, when executed with one or more processors, cause a cyber defense system to perform the operations of claim 14.

* * * * *